US011226223B2

(12) United States Patent
Montag et al.

(10) Patent No.: US 11,226,223 B2
(45) Date of Patent: Jan. 18, 2022

(54) MODULATED METERING SYSTEM

(71) Applicant: Montag Investments, LLC, Emmetsburg, IA (US)

(72) Inventors: Roger A. Montag, Malcolm, NE (US); Isaac Mogler, West Bend, IA (US)

(73) Assignee: Montag Investments, LLC, Emmetsburg, IA (US)

( * ) Notice: Subject to any disclaimer, the term of this patent is extended or adjusted under 35 U.S.C. 154(b) by 484 days.

(21) Appl. No.: 16/366,805

(22) Filed: Mar. 27, 2019

(65) Prior Publication Data

US 2019/0219433 A1 Jul. 18, 2019

Related U.S. Application Data

(60) Continuation of application No. 15/988,642, filed on May 24, 2018, now Pat. No. 10,260,924, which is a division of application No. 14/600,624, filed on Jan. 20, 2015, now Pat. No. 10,088,350.

(51) Int. Cl.

*B65G 53/08* (2006.01)
*G01F 11/00* (2006.01)
*B65G 53/04* (2006.01)

(52) U.S. Cl.

CPC ............ *G01F 11/003* (2013.01); *B65G 53/04* (2013.01)

(58) Field of Classification Search

CPC ...................................................... B65G 53/08
USPC ........................................... 366/156.2, 177.1
See application file for complete search history.

(56) References Cited

U.S. PATENT DOCUMENTS

| | | | |
|---|---|---|---|
| 318,377 | A | 5/1885 | Latcha |
| 557,058 | A | 3/1896 | Dodge |
| 771,118 | A | 9/1904 | Bechtel et al. |
| 1,630,317 | A | 5/1927 | Skonier |
| 1,786,969 | A | 12/1930 | Van Der Heuel |

(Continued)

FOREIGN PATENT DOCUMENTS

| | | | |
|---|---|---|---|
| CN | 101828099 | A | 9/2010 |
| CN | 202497837 | U | 10/2012 |

(Continued)

OTHER PUBLICATIONS

"International Application No. PCT/US2015/012021 International Search Report and Written Opinion", dated May 5, 2015, 18 pages.

(Continued)

*Primary Examiner* — David L Sorkin

(74) *Attorney, Agent, or Firm* — Goodhue, Coleman & Owens, P.C.

(57) ABSTRACT

An improved modulated particulate metering system is provided. The system includes a plurality of particulate storage areas, each having a separate type of particulate. The system can include varied configurations of a plurality of cartridges in communication with one of the particulate storage containers. The system can further include varied configurations of a plurality of gearboxes operably connected to the cartridges. The gearboxes can be adapted to be inverted and operably controlled by one or more drive shafts. The system can still further include varied configurations of a plurality of particulate accelerators in fluid communication with an air flow path having one inlet. The system permits a user to efficiently alternate between desired configurations based on the needs of the application.

20 Claims, 20 Drawing Sheets

(56) References Cited

U.S. PATENT DOCUMENTS

| | | | |
|---|---|---|---|
| 1,805,940 A | | 5/1931 | Dolan |
| 1,992,090 A | | 2/1935 | Paolo |
| 2,395,973 A | | 3/1946 | Mcintosh |
| 2,452,898 A | | 11/1948 | Bourdette |
| 2,793,914 A | | 5/1957 | Gardeniers et al. |
| 2,865,260 A | | 12/1958 | Lee |
| 2,959,869 A | | 11/1960 | Ackerman |
| 3,314,734 A | | 4/1967 | Lewis |
| 3,373,973 A | | 3/1968 | Holthausen |
| 3,386,773 A | | 6/1968 | Ballard, Jr. |
| 3,568,937 A | | 3/1971 | Grataloup |
| 3,596,805 A | | 8/1971 | Farmery |
| 3,606,097 A | | 9/1971 | Wall |
| 3,625,431 A | | 12/1971 | Andersson |
| 3,708,208 A | | 1/1973 | Fuss |
| 3,710,983 A | | 1/1973 | Ricciardi |
| 3,893,515 A | | 7/1975 | Sadler |
| 3,894,721 A | | 7/1975 | Boenisch |
| 3,926,377 A | | 12/1975 | Johnson |
| 4,008,855 A | | 2/1977 | van der Lely |
| 4,020,991 A | | 5/1977 | Dreyer |
| 4,087,079 A | | 5/1978 | Kramer |
| 4,142,685 A | | 3/1979 | Dreyer et al. |
| 4,296,695 A | | 10/1981 | Quanbeck |
| 4,402,635 A | | 9/1983 | Maruo |
| 4,413,934 A | | 11/1983 | Kern |
| 4,422,810 A | | 12/1983 | Boring |
| 4,432,675 A | | 2/1984 | Machnee |
| 4,473,016 A | | 9/1984 | Gust |
| 4,479,743 A | | 10/1984 | Stahl |
| 4,495,968 A | | 1/1985 | Kist |
| 4,529,104 A | | 7/1985 | Tyler |
| 4,561,781 A | | 12/1985 | Seymour |
| 4,562,968 A | | 1/1986 | Widmer et al. |
| 4,569,486 A | | 2/1986 | Balmer |
| 4,583,883 A | | 4/1986 | Johanning |
| 4,793,744 A | | 12/1988 | Montag |
| 4,801,210 A | | 1/1989 | Gian |
| 4,834,004 A | | 5/1989 | Butuk et al. |
| 4,900,157 A | | 2/1990 | Stegemoeller et al. |
| 5,018,869 A | | 5/1991 | Paul |
| 5,087,155 A | * | 2/1992 | Herman ................. B65G 53/08 406/57 |
| 5,104,229 A | | 4/1992 | Paul |
| 5,299,888 A | | 4/1994 | Wysong et al. |
| 5,592,889 A | | 1/1997 | Bourgault |
| 5,775,585 A | | 7/1998 | Duello |
| 5,913,602 A | | 6/1999 | Steele |
| 5,934,205 A | | 8/1999 | Gordon |
| 6,142,714 A | | 11/2000 | Montag |
| 6,305,835 B1 | | 10/2001 | Farrar et al. |
| 7,344,298 B2 | | 3/2008 | Wilmer et al. |
| 7,854,066 B2 | | 12/2010 | Wendte |
| 8,336,469 B2 | | 12/2012 | Preheim et al. |
| 8,616,761 B2 | | 12/2013 | McLaughlin et al. |
| 9,681,602 B2 | | 6/2017 | Montag et al. |
| 9,781,878 B2 | | 10/2017 | Montag |
| 2003/0161694 A1 | | 8/2003 | Bauver et al. |
| 2005/0024988 A1 | | 2/2005 | Hoff et al. |
| 2012/0186501 A1 | | 7/2012 | Zarnescu et al. |
| 2012/0211508 A1 | | 8/2012 | Barsi et al. |
| 2012/0230778 A1 | | 9/2012 | Petit et al. |
| 2016/0207015 A1 | | 7/2016 | Montag et al. |
| 2016/0207016 A1 | | 7/2016 | Montag et al. |
| 2016/0207018 A1 | | 7/2016 | Montag et al. |
| 2016/0207718 A1 | | 7/2016 | Montag et al. |

FOREIGN PATENT DOCUMENTS

| | | |
|---|---|---|
| CN | 103349930 A | 10/2013 |
| CN | 104923097 A | 9/2015 |

OTHER PUBLICATIONS

"International Application No. PCT/US2015/012050 International Search Report and Written Opinion", dated May 5, 2015, 17 pages.

* cited by examiner

MODULATED METERING SYSTEM

CROSS-REFERENCE TO RELATED APPLICATIONS

This application is a Continuation Application of U.S. patent application Ser. No. 15/988,642 filed on May 24, 2018, which is a Divisional Application of U.S. Ser. No. 14/600,624, now U.S. Pat. No. 10,088,350, filed Jan. 20, 2015, all applications sharing the title Modulated Metering System all of which are herein incorporated by reference in their entirety.

BACKGROUND

I. Field of the Disclosure

A metering system for solid particulate is disclosed. More specifically, but not exclusively, a modular metering system with variable blend and variable application rate controls for particulate matter, such as dry fertilizers, is disclosed.

II. Description of the Prior Art

Particulate metering systems use varied approaches to control the rate at which particulate is metered and/or blended with other particulate types. Often, airflow generated by an air source, such as a blower, is directed through a tube, after which particulate enters the airflow and is metered to the field. In most instances, particularly where the particulate is fertilizer, there is significant interest in controlling the blend and the application rate of two or more fertilizers, and specifically controlling a variation in the blend and application rate of two or more fertilizers at separate discharge points, such as at separate rows in a field. Therefore, a need exists for a modular metering system that permits a user to efficiently alternate between desired configurations based on the needs of the application. Further complications surround instances where one or more components of the particulate metering system experiences complications or failure. Therefore, a further need exists for a modular metering system that permits a user to uninstall and install components quickly and efficiently to minimize downtime between operations.

SUMMARY

The present disclosure provides a modulated particulate metering system with variable blend and variable application rate controls for separate discharges or a group of discharges.

A modulated metering system includes an air flow path having one inlet. A plurality of particulate accelerators is provided. Each of the particulate accelerators is in fluid communication with the air flow path. The system can include a first configuration having a first plurality of discharges. In the first configuration, the particulate accelerators are in fluid communication with the first plurality of discharges. The system can also include a second configuration having a second plurality of discharges. In the second configuration, the particulate accelerators are in fluid communication with the second plurality of discharges. A plurality of particulate sources can be in operable communication with the particulate accelerators in the first configuration or the second configuration. A quantity of the particulate accelerators in the first configuration is more or less than a quantity of particulate accelerators in the second configuration.

The particulate accelerators can be removably connected to the first plurality of discharges or the second plurality of discharges. The particulate accelerators can be removably connected by a quick-coupling mechanism. The first plurality of discharges and the second plurality of discharges can be selectively closed.

The system can include a plurality of operated conveyances. Each of the operated conveyances is in operable communication with one of the particulate storage areas. The operated conveyances are also in operable communication with the particulate accelerators. The operated conveyances can convey particulate to the particulate accelerators.

According to another aspect of the disclosure, the modulated metering system includes a plurality of particulate storage areas. Each of the particulate storage areas can have a separate type of particulate. A plurality of cartridges is provided. Each of the cartridges is in communication with one of the particulate storage containers. The system can include a first configuration of the cartridges comprising a first plurality of inputs and a first plurality of outputs. The system can also include a second configuration of the cartridges comprising a second plurality of inputs and a second plurality of outputs. A plurality of particulate accelerators can be in communication with the first plurality of outputs of the first configuration or the second plurality of outputs of the second configuration. A plurality of air-particulate discharges is provided. Each of the air-particulate discharges can be in fluid communication with one of the particulate accelerators. The first plurality of inputs and the first plurality of outputs of the first configuration are more or less than the second plurality of inputs and the second plurality of outputs of the second configuration.

The system can include a first plurality of gearboxes in operable communication with the cartridges of the first configuration and second plurality of gearboxes in operable communication with the cartridges of the second configuration. A drive shaft can be in operable communication with the first plurality of gearboxes or the second plurality of gearboxes. A motor in operable control of the drive shaft is provided. The first plurality of gearboxes can be more or less than the second plurality of gearboxes. One or more of the first plurality of gearboxes or the second plurality of gearboxes can be adapted to be inverted. The inverted plurality of gearboxes can be operably controlled by a second drive shaft.

The system can further include an air flow path comprised of an air source, the plurality of particulate accelerators, and the plurality of air-particulate discharges. A mixing area is within each of the particulate accelerators. The air flow path and particulate mixes within the mixing area. The air-particulate mixture outputs at each of the air-particulate discharges.

According to yet another aspect of the disclosure, a modulated metering system for particulate includes a flow path having an inlet in communication with one or more intake point and an outlet in communication with one or more discharge points. A particulate storage with two or more separated storage areas can be in communication with the flow path. The system can include a flow path configuration having a first configuration with a first set of separated mixing areas within the flow path and a second configuration with a second set of separated mixing areas within the flow path. The second set of separated mixing areas can be more or less than the first set of separated mixing areas for the first configuration of the flow path. Each of the first or the second set of separated mixing areas can be in communication with one of the one or more discharge points.

A plenum within the flow path can be provided. The plenum can have a plurality of outlets. One of the first set of separated mixing areas or one of the second set of separated mixing areas can be connected to one of the outlets on the plenum. A plurality of operated conveyances can be associated with a first metering control configuration and a second metering control configuration. The operated conveyances can be in communication with the first set of separated mixing areas and the second set of separated mixing areas. The flow path and the flow path configuration can have a common air source.

BRIEF DESCRIPTION OF THE DRAWINGS

Illustrated embodiments of the disclosure are described in detail below with reference to the attached drawing figures, which are incorporated by reference herein, and where.

DETAILED DESCRIPTION

Figure 1:
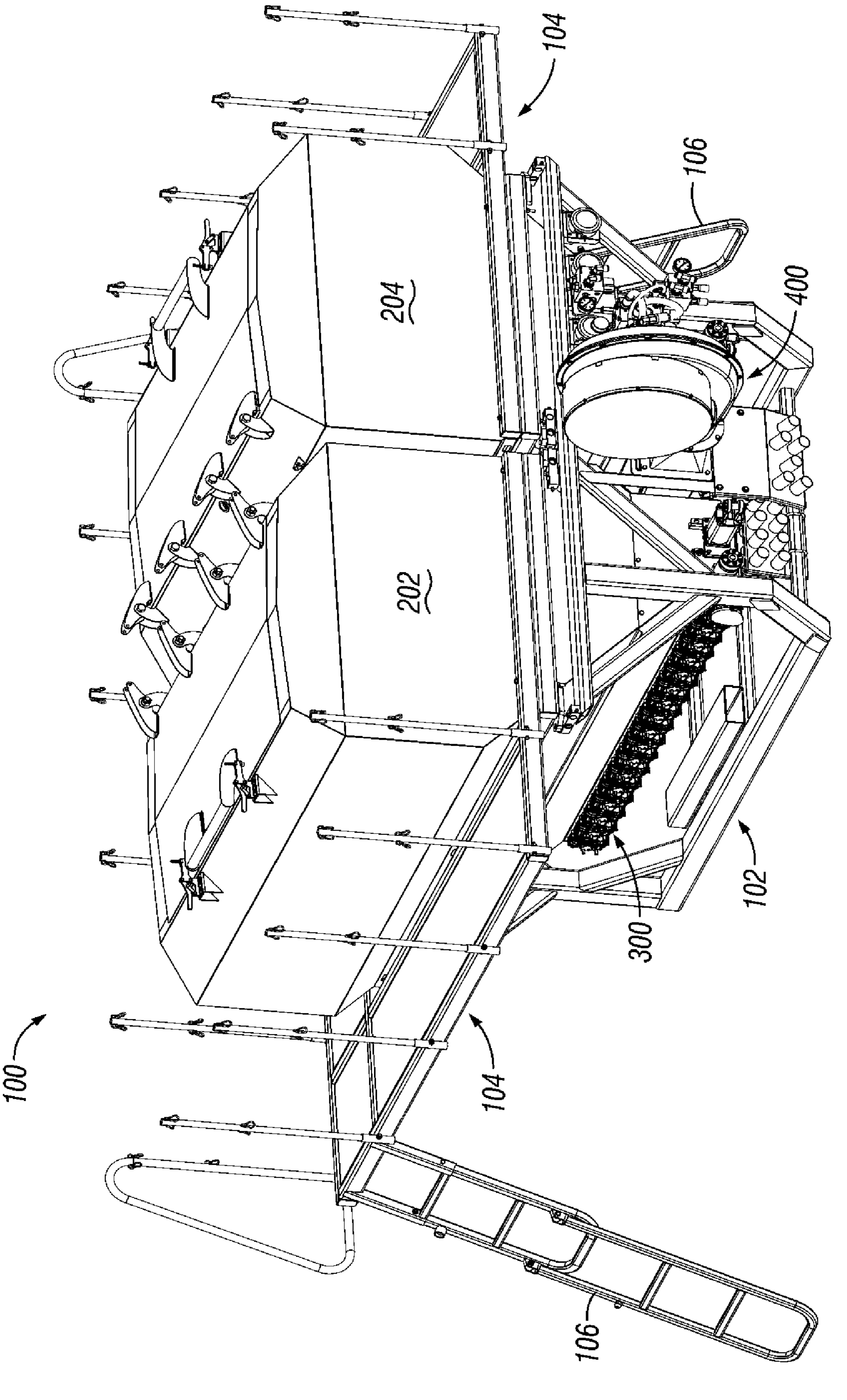
FIG. 1 is a front perspective view of a particulate metering implement in accordance with an illustrative embodiment.
Figure 11:
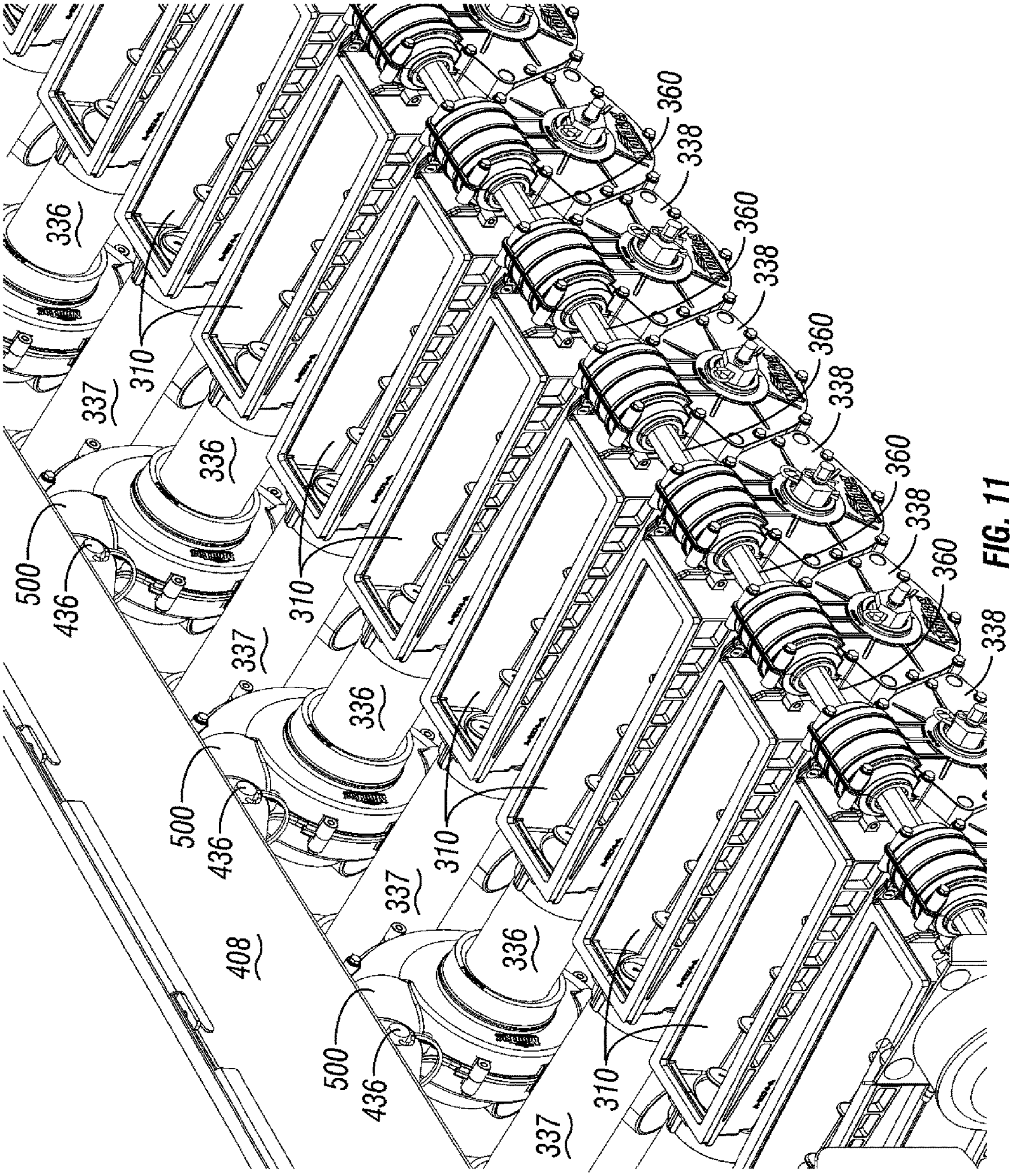
FIG. 11 is a front perspective view of a portion of a plurality of particulate handling systems and particulate accelerators in accordance with an illustrative embodiment

FIG. 1 shows a particulate metering implement 100. While the figure shows a particulate metering implement, it should be appreciated by those skilled in the art that the disclosure covers other types of implements, including but not limited to, seed meters, seed planters, nutrient applicators, and other agricultural equipment. The implement 100 can be mounted upon a towable trailer or other suitable structure such as a toolbar, or integrally formed with a particulate application system. The implement can include a frame assembly 102, upon which particulate containers 202 and 204 can be mounted. For user accessibility to the particulate containers 202 and 204, a platform 104 and ladders 106 can be provided. The implement can also include a particulate handling system 300, an air production and handling system 400, and particulate accelerator system 500 (FIG. 11).

Figure 2A:
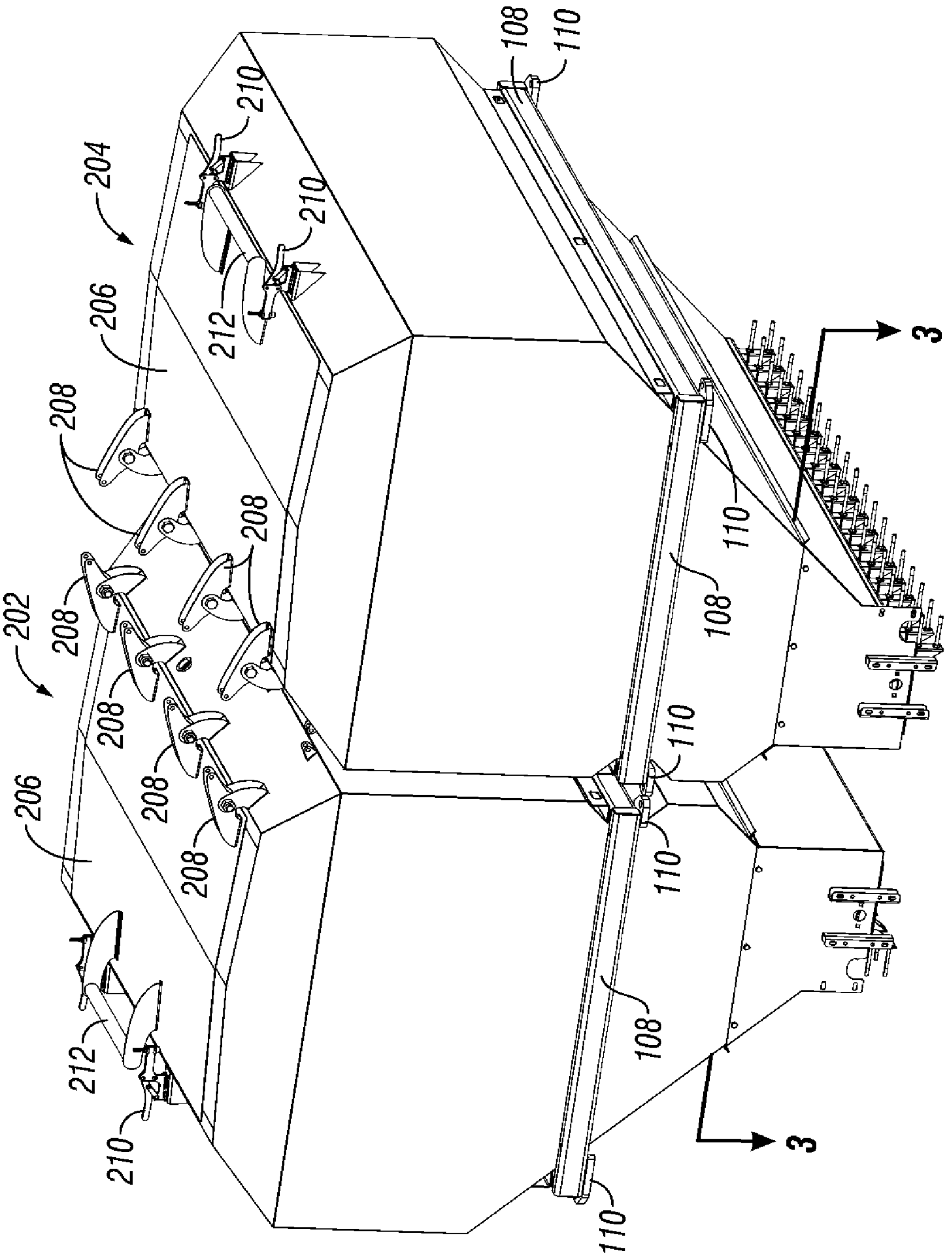
FIG. 2A is a front perspective view of a particulate container system in accordance with an illustrative embodiment.

Referring to FIG. 2A, the particulate containers 202 and 204 can be connected to the frame assembly 102 by frame members 108 having attachment means 110. A top surface of the particulate containers 202 and 204 can include openings (not shown) covered by one or more lids 206. The lids 206 can be opened or removed to permit loading of particulate into and/or servicing the particulate containers 202 and 204. In an exemplary embodiment, an edge of the lids 206 can be pivotally connected to the particulate containers 202 and 204 with one or more hinges 208. One or more clamps 210 can be mounted on the particulate containers 202 and 204 proximate to the opposing edge of the lids 206 to releasably secure the lids to the containers. To assist in opening the lids 206, a handle 212 can be connected to the lids 206 proximate the clamps 210. Upon opening and/or removal of the lids 206, one or more screens (not shown) can be disposed within the openings of the particulate containers 202 and 204 to prevent debris from entering the same.

Further, the clamps 210 can provide an airtight seal between the lids 206 and the particulate containers 202 and 204. In such an embodiment, the airtight seal can permit the particulate containers 202 and 204 to be pressurized. In one representative example, the particulate containers 202 and 204 can be pressurized to ten, fifteen, twenty or greater inches of water (in $H_2O$). The pressurization can assist in guiding the particulate to the particulate handling system 300, provide for improved control of quantities dispensed to the particulate handling system 300, and/or provide for improved control of the environment in which the particulate is housed.

In an exemplary embodiment, the particulate containers 202 and 204 can be symmetrical in structure and identical in function. In other embodiments, the one or more of the particulate containers can be modified without deviating from the objects of the disclosure. In yet other embodiments, the frame assembly, and particularly frame members 108, can permit one or more particulate containers 202 and 204 to be efficiently removed from the implement, as shown illustratively in FIG. 2B. Based on the tapering nature of middle portions 216 and lower portions 218 of the particulate containers 202 and 204, the containers can be raised through a perimeter defined by the frame members 108. Thereafter, the implement can operate with one container; a replacement particulate container can be efficiently installed; or a substitute container (with different dimensions, structure, function, etc.) can be efficiently installed, thereby increasing the modularity of the implement.

Hereinafter, discussion of particulate container 204 refers to particulate container 204 and its counterpart structure particulate container 202.

Figure 2B:
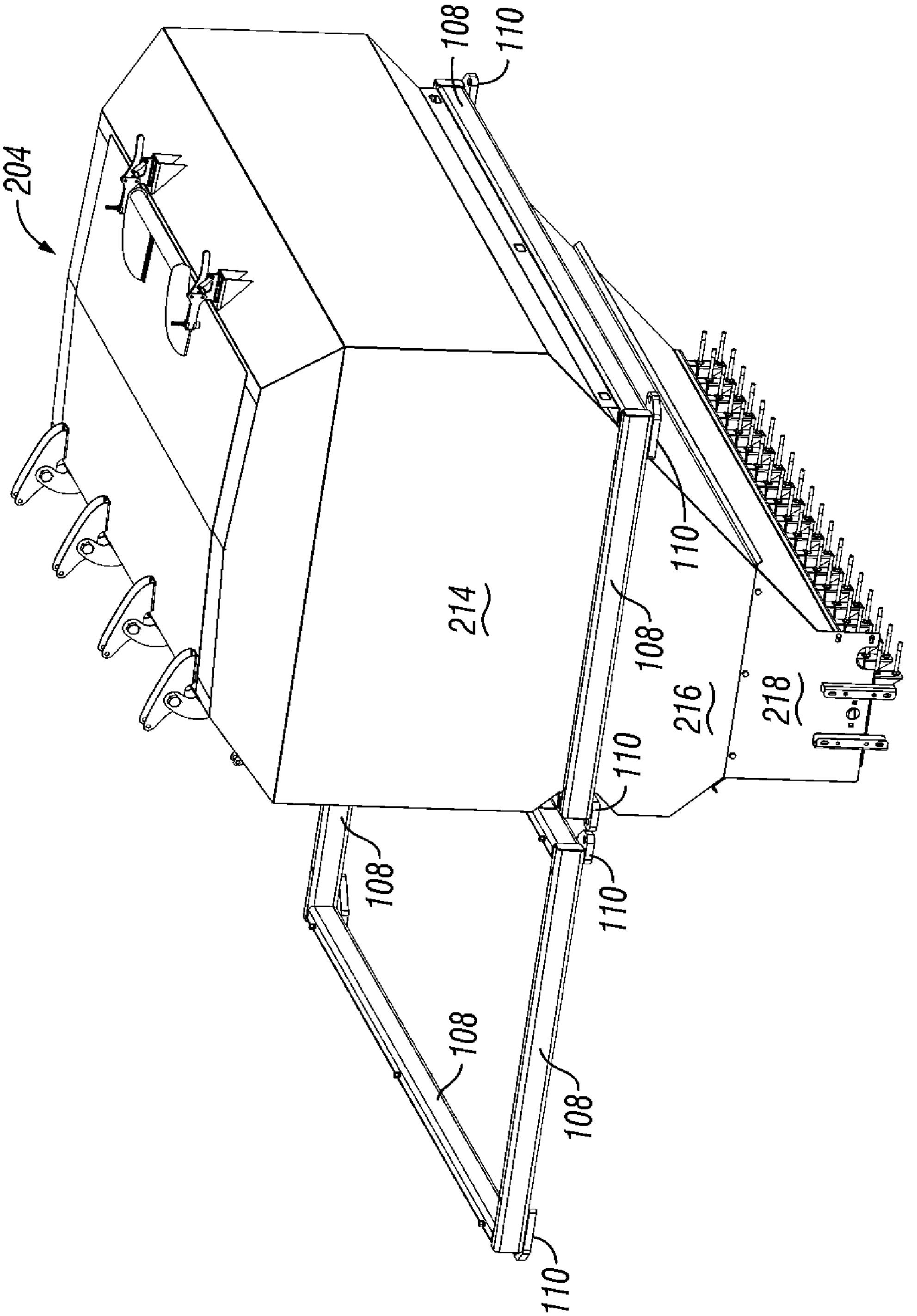
FIG. 2B is a front perspective view of a particulate container system in accordance with an illustrative embodiment.

Referring to FIG. 2B, particulate container 204 can include an upper portion 214, a middle portion 216, and a lower portion 218. The upper portion 214 can be a rectangular prism or like shapes to maximize storage capacity above the frame assembly. The middle portion 216 can be a trapezium prism or like shapes to assist in funneling the particulate to the lower portion 218. The transition from the upper portion 214 to the middle portion 216 can be generally demarcated by the frame members 108 disposed around the perimeter of the of the particulate container 204. The particulate container 204 can also have a recessed area on the side wall proximate to opposing particulate container 202 to prevent frame member 108 from extending past the plane of the side wall, maximize the volume of the particulate container 204, and minimize the space required between the two particulate containers 202 and 204. The lower portion 218 can also be a trapezium prism or like shapes to assist in funneling the particulate to the base of the particulate container 204.

Further, to assist in servicing the inside of the particulate container 204, a ladder (not shown) can be provided.

In addition to the shape of the particulate container 204, other means can be provided on or within the container to assist in funneling the particulate to the base of the container and/or to prevent agglomerations of particulate within the container. Such means can include, but are not limited to, agitators, augers, pneumatics, belt drives, internal structures, and the like.

Figure 3:
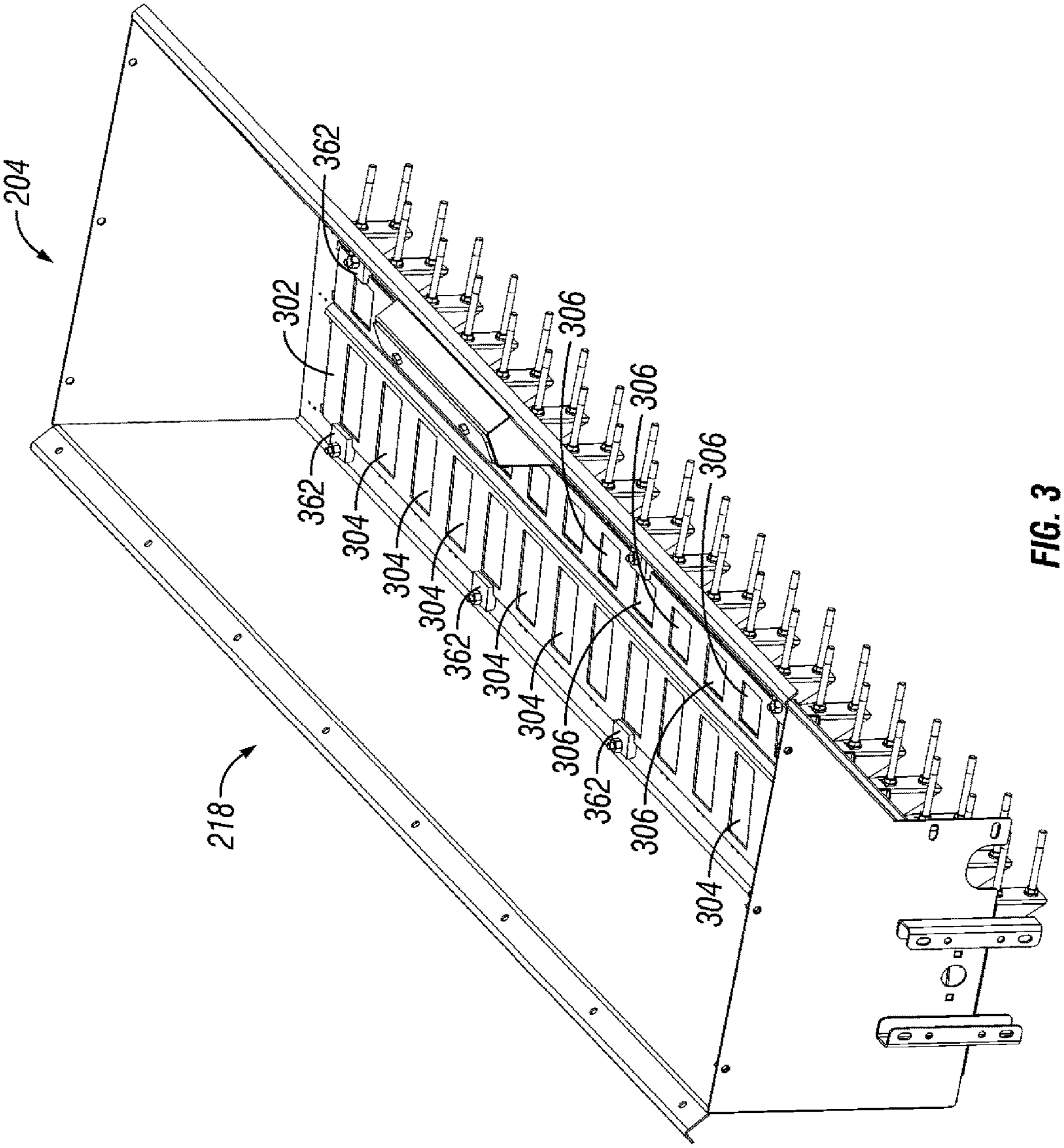
FIG. 3 is a cross-sectional view of the particulate container system of FIG. 2A taken along section line 3-3.
Figure 4:
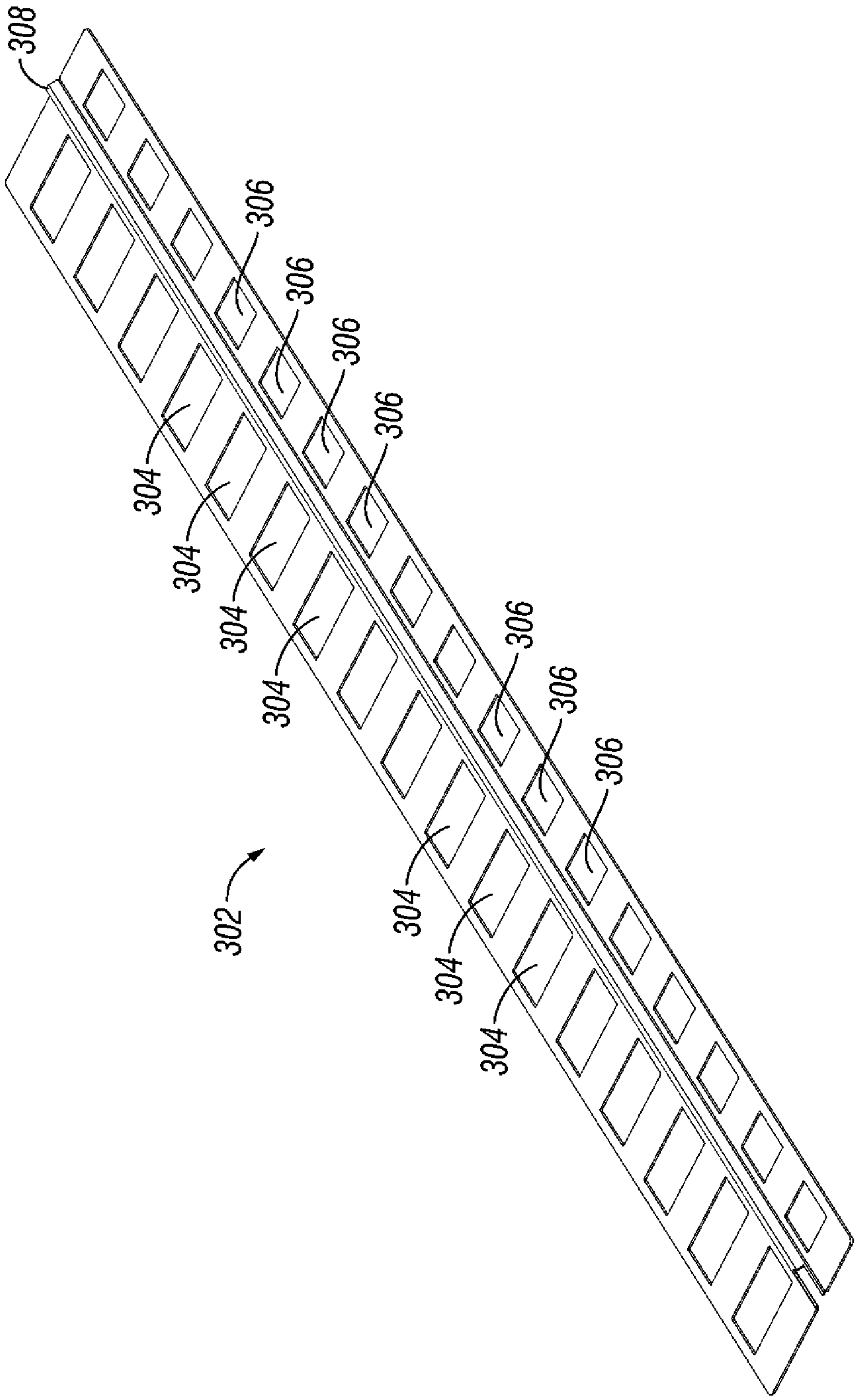
FIG. 4 is an isometric view of a bottom tray of a particulate container in accordance with an illustrative embodiment.
Figure 5A:
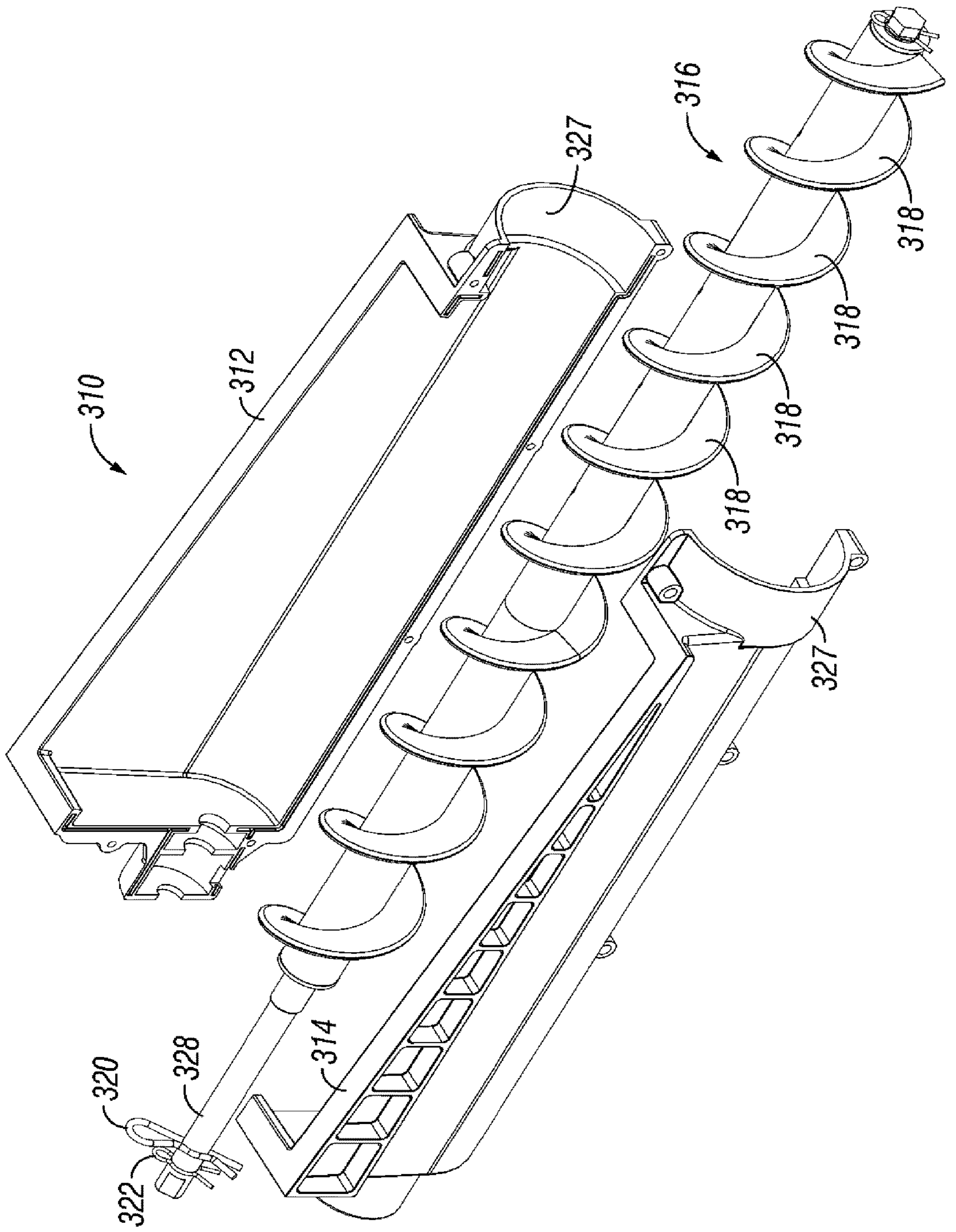
FIG. 5A is an exploded front perspective view of a cartridge in accordance with an illustrative embodiment.

The lower portion 218 of the particulate container 204 can include a bottom tray 302, as shown in FIGS. 3 and 4. The bottom tray 302 can include a plurality of large gates 304 and a plurality of small gates 306 arranged along the length of the bottom tray 302. The plurality of gates 304 and 306 can be square and/or rectangular, as shown, or can be of any shape to permit particulate to enter the particulate handling system 300 (FIG. 1). Similarly, the plurality of gates 304 and 306 can all be the same shape and/or size, or of varied shapes and/or sizes based on the application. The interstitial portions of the bottom tray 302 can be flat, as shown, or can have a wedged-shape configuration to funnel particulate to the plurality of gates 304 and 306. The bottom tray 302 can be integrally connected to the lower portion 218 of the particulate container 204, or can be removable via securing means 362 to permit a user to quickly install a different bottom tray 302 based on the needs of the application, further increasing the modularity of the system. The plurality of large gates 304 and the plurality of small gates 306 can be separated by a raised portion 308. The raised portion 308 can funnel the particulate into the plurality of large gates 304 and the plurality of small gates 306 and/or add structural support along the length of the bottom tray 302. Separating the particulate into a pairs of gates (e.g., large gates 304 and small gates 306) can minimize undesirable torqueing of the screw conveyors 316 (FIG. 5A) and auger motors (not shown), particularly during initialization of the particulate handling system.

Figure 5B:
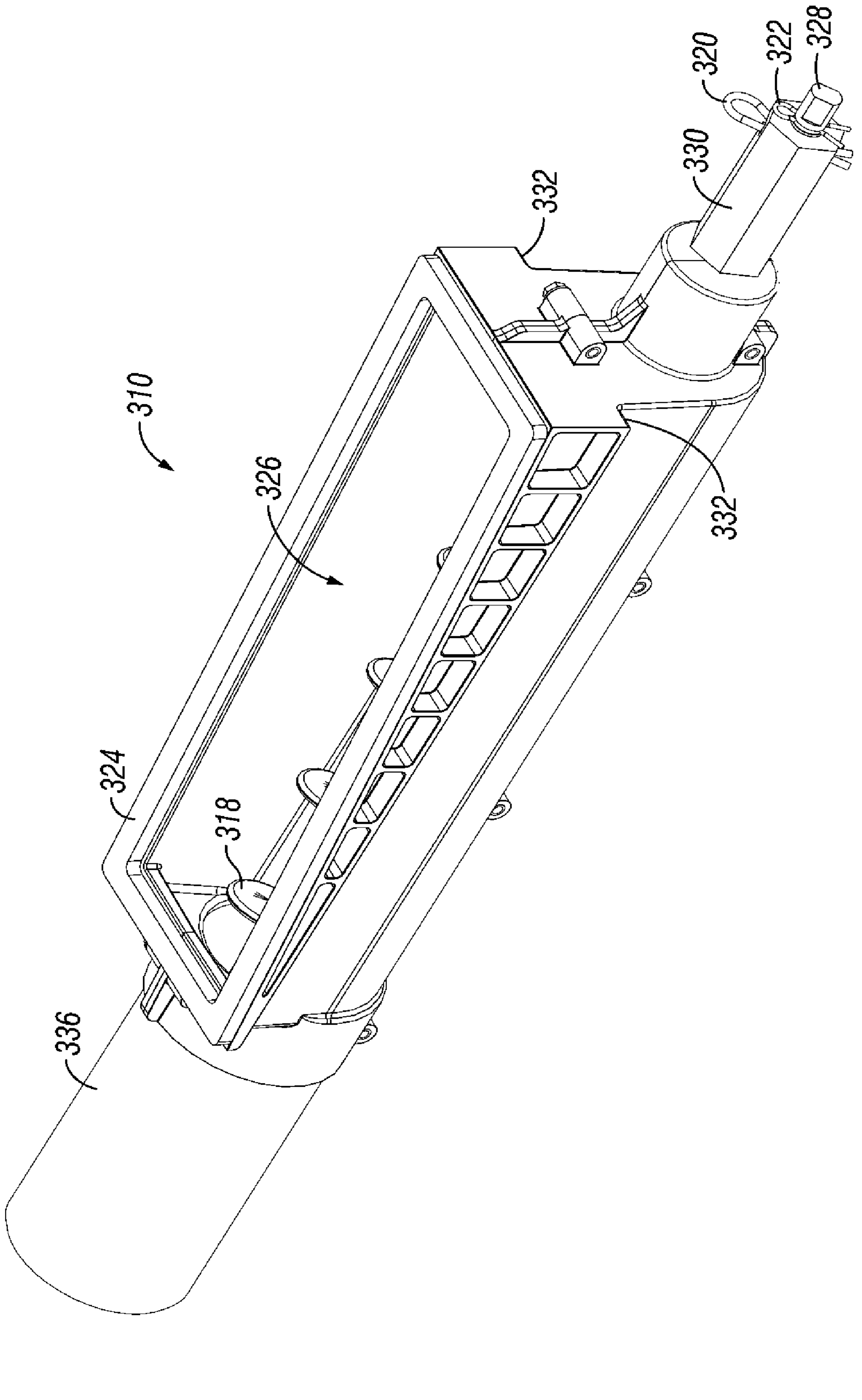
FIG. 5B is a front perspective view of a cartridge in accordance with an illustrative embodiment.

A plurality of moveable and/or controllable gate covers (not shown) can be installed on plurality of gates 304 and 306. The gate covers, when closed, can prevent particulate from filling the plurality of cartridges 310, as shown illustratively in FIGS. 5A and 5B. The gate covers can be manually controlled or operatively controlled. The configuration can further increase the modularity of the metering system by limiting which discharge points (e.g., row units), if any, receive one or more of the types of particulate.

One or more scales (not shown) can be associated with each of the particulate containers 202 and 204. The scales can be operatively connected to a control system and configured to weigh each of the particulate containers 202 and 204. Together with one or more sensors associated with one or more transmissions 338 (FIGS. 6 and 7) discussed below, the system can provide real-time and/or post-operation feedback of the expected volume of particulate dispensed versus actual volume of particulate dispensed for each unit row of the field and/or for the overall particulate metering implement. To determine expected volume of particulate dispensed, speed sensors can measure the number of rotations of a shaft 328 with flightings 318, as shown illustratively in FIG. 5A. Based on the number and known dimensions of the flightings 318, including diameter and helix angle, an estimation of how much particulate is dispensed per revolution can be obtained. The estimation can be applied to each unit row for the particulate metering implement, each of which can be operating at varied rates. The total expected volume can then be compared to the change in weight (multiplied by the density of the particulate) as measured by the one or more scales associated with the particulate containers 202 and 204. Further, in an embodiment utilizing real-time feedback, the control system can make adjustments based on the data provided to reconcile the expected volume of particulate dispensed versus actual volume of particulate dispensed. Still further, the data can be used by the control system to diagnose dysfunctional screw conveyor(s) 316 and/or auger motors, and/or identify potential blockages of particulate within the particulate metering implement.

Figure 10:
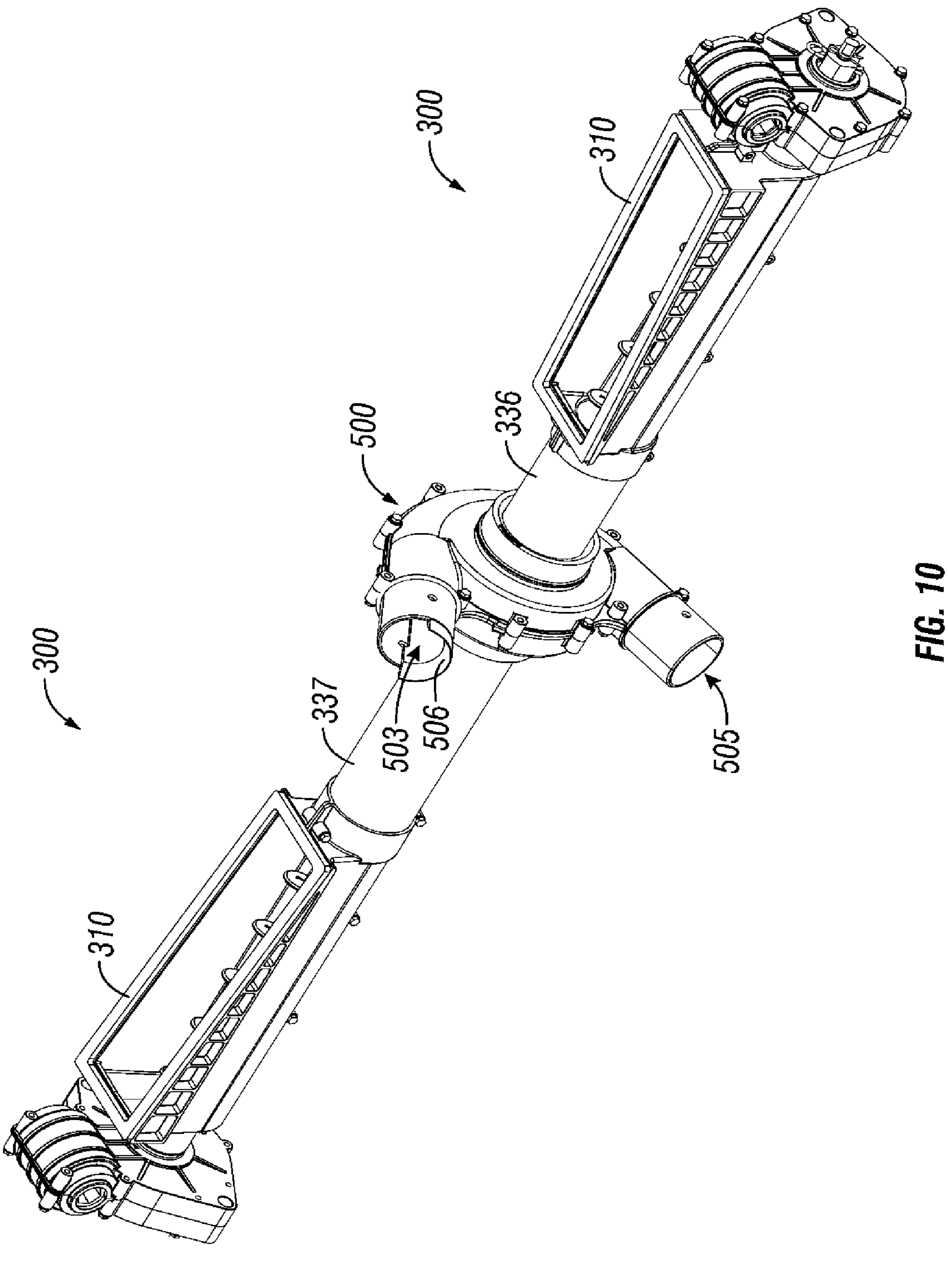
FIG. 10 is a front perspective view of particulate handling systems and a particulate accelerator in accordance with an illustrative embodiment.

Disposed below the bottom tray 302 can be a plurality of cartridges 310. An exemplary embodiment of the cartridge 310 is shown illustratively in FIGS. 5A and 5B. The cartridge 310 can include an input slot 326 sized and shaped to receive particulate passing through the plurality of large gates 304 and the plurality of small gates 306 in the bottom tray 302. A gasket 324 can seal the cartridge 310 to the inferior side of bottom tray 302. The seal can prevent particulate from escaping the system, particularly in instances where the particulate containers 202 and 204 are pressurized. The cartridge 310 can be constructed in two halves 312 and 314. Each of the two halves 312 and 314 can include a curved flange portion 327 adapted to receive a short auger tube 336 or a long auger tube 337 (FIGS. 10 and 11). While two halves can provide for ease of manufacturing, the present disclosure also contemplates a unitary cartridge construction.

Within the input slot 326 of the cartridge 310 is a screw conveyor 316. In an exemplary embodiment shown illustratively in FIGS. 5A and 5B, the screw conveyor 316 can include a shaft 328 and flightings 318 as commonly known in the art. The shaft 328 can be comprised of two shaft sections. While the embodiment can utilize a screw conveyor, it can be appreciated by those skilled in the art that the disclosure covers other means of transmitting the material through a tube, including but not limited to, hydraulic pistons, pneumatics, slides, belts, and the like. Encircling the inner shaft 328 can be a drive shaft 330. The shaft 328 and the drive shaft 330 can be rotatably engaged with a pin 320. The axial position of the drive shaft 330 on the shaft 328 can be preserved through a pin 322 extending through the shaft 328 proximate to an edge of the drive shaft 330. The drive shaft 330 can be hexagonal to engage a drive shaft opening 346 in the gearbox 338, as shown illustratively in FIGS. 6 and 7. The drive shaft 330 can be hexagonal as shown, or can be of any shape suitable to engage the gearbox 338 and achieve the objects of the disclosure. Further, the present disclosure envisions the shaft 328 and the drive shaft 330 being a unitary construction.

Figure 6:
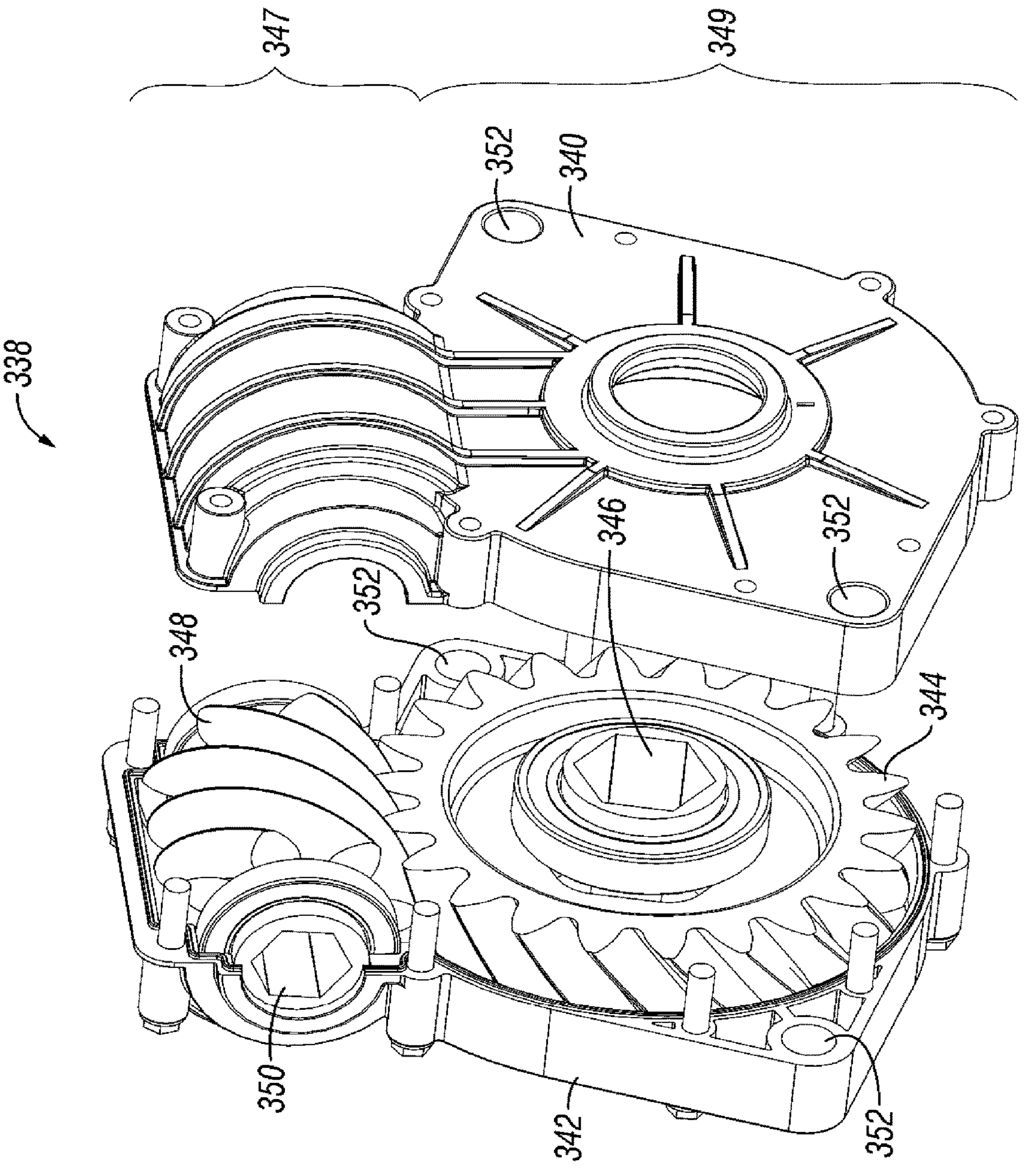
FIG. 6 is an exploded front perspective view of a gearbox in accordance with an illustrative embodiment.
Figure 16:
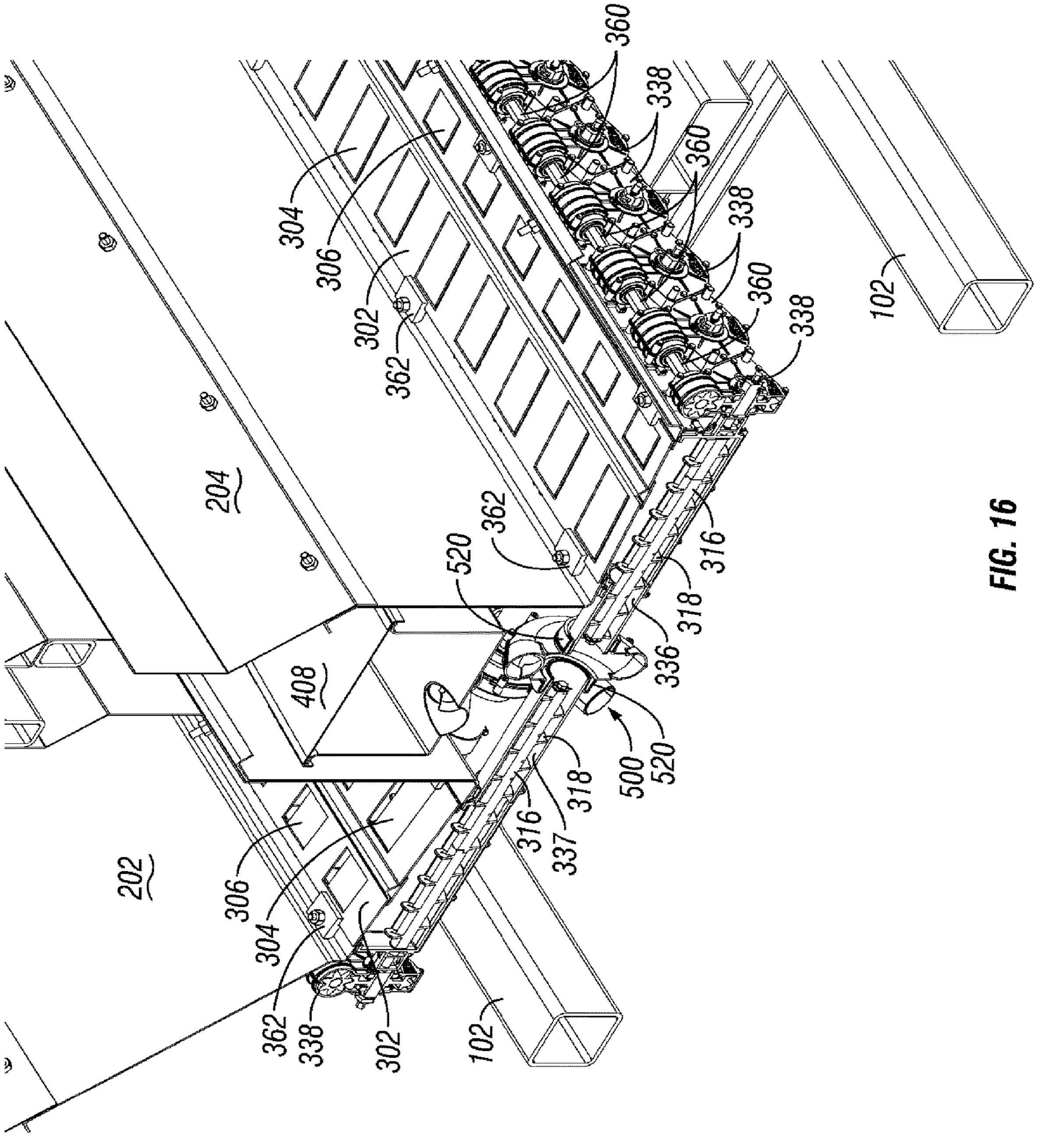
FIG. 16 is a cross-sectional view of a plenum, a plurality of particulate handling systems and particulate accelerator system in accordance with an illustrative embodiment.

A gearbox 338 is provided in FIG. 6. The gearbox 338 can be configured of two connectable halves 340 and 342 to provide for ease of manufacturing. The gearbox 338 can include an input portion 347 and an output portion 349. The input portion 347 can include a main shaft opening 350 extending through the input portion 347. The main shaft opening 350 can be adapted to receive and engage a main drive shaft 360 (FIG. 16). In the illustrative embodiment of FIG. 6, the main shaft opening 350 is hexagonal, but can be of any shape suitable to achieve the objects of the disclosure. The main shaft opening 350 can comprise an inner portion of an input helical gear 348. As one or more gearboxes 338 can be connected in parallel, as discussed below, the main drive shaft 360 can span the length of the particulate container 204 and simultaneously drive multiple gearboxes 338, as shown illustratively in FIG. 16. The output portion 349 can include a drive shaft opening 346 adapted to engage the drive shaft 330 of the cartridge 310, as discussed above. The drive shaft opening 346 can comprise an inner portion of an output helical gear 344. The input helical gear 348 and output helical gear 344 can be in a crossed configuration, as shown in FIG. 6. While the illustrative embodiment shows helical gears in a crossed configuration, the present disclosure contemplates any type of gearing needed to achieve the objects of the disclosure, including but not limited to, spur gears, bevel gears, spiral bevels, and the like. The drive shaft opening 346 can be orthogonal to main shaft opening 350, whereby each of the gearboxes 338 transfers the rotational speed and torque provided by the main drive shaft 360 to an associated screw conveyor 316 disposed within a cartridge 310. The present disclosure also contemplates other means for transferring the rotational speed and torque provided by the main drive shaft 360 to an associated screw conveyor 316, including but not limited to, electromagnetic induction, belts, and the like.

In another embodiment, a motor can be operatively connected to each cartridge, thereby removing the need for a gearbox. In the embodiment, the plurality of motors can be connected to the plurality of screw conveyors 316 to independently control each of the plurality of screw conveyors 316. Each of the plurality of motors can be operatively connected to a control system to produce a desired speed of each screw conveyor 316, of a group or bank of the screw conveyors 316, or of all the screw conveyors 316.

Figure 7:
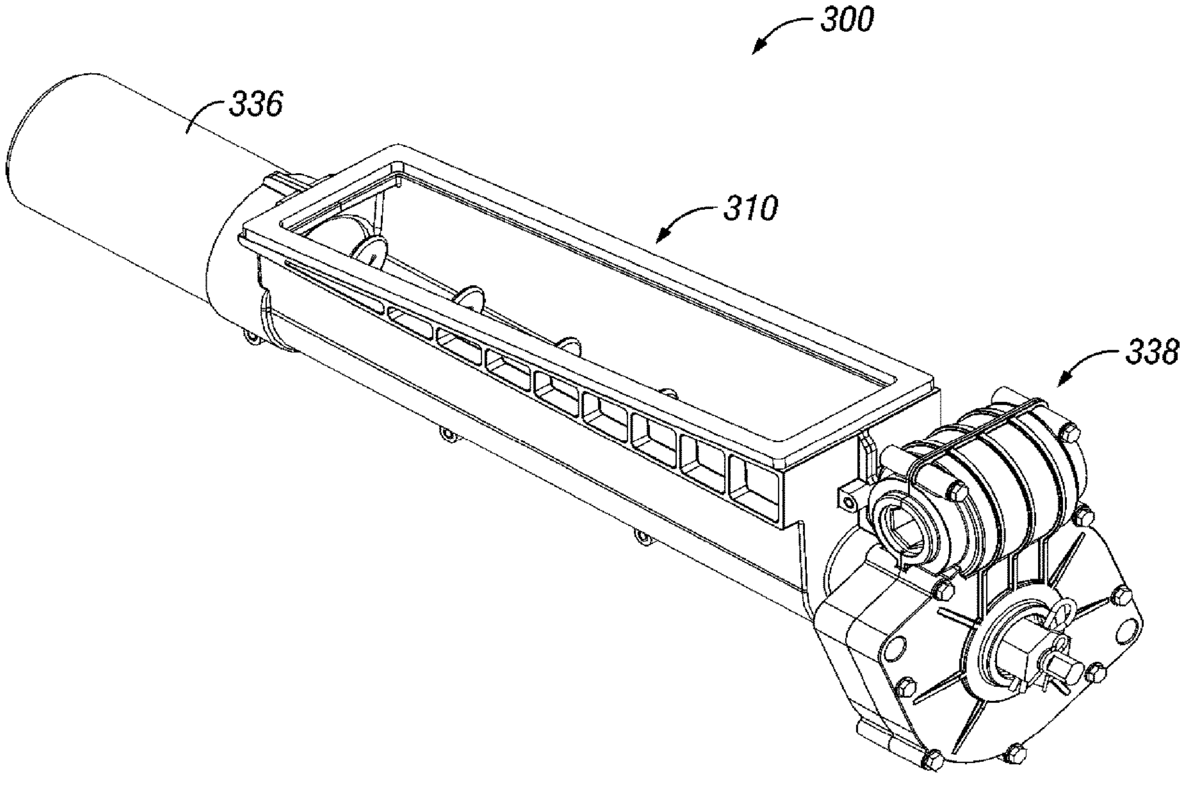
FIG. 7 is a front perspective view of a particulate handling system in accordance with an illustrative embodiment.

Referring to FIGS. 7 and 10, each cartridge 310 can be adapted to operatively connect to a gearbox 338. A short auger tube 336 or long auger tube 337 can extend from each cartridge 310.

Figure 8:
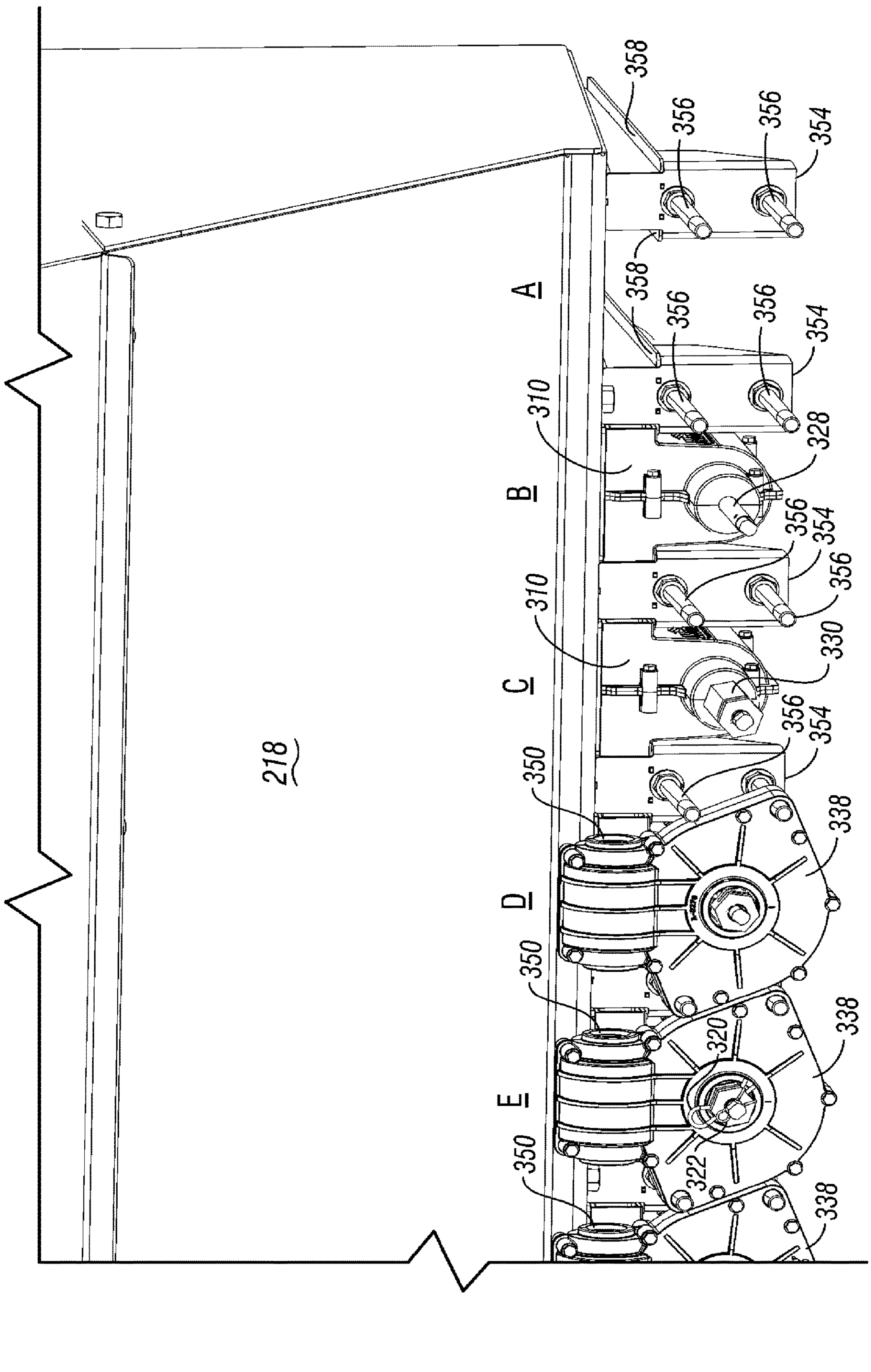
FIG. 8 is a partial front perspective view of particulate handling systems at various stages of installation in accordance with an illustrative embodiment.

As shown illustratively in FIG. 8, each of the cartridges 310 can be disposed between two hangars 354 affixed to the lower section 218 of the particulate container 204. The hangars 354 can be welded to the container, or can be affixed by any means commonly known in the art, including but not limited to, nut and bolt, screws, rivets, soldering, and the like. Extending outwardly along the length of the hangar 354 can be two guide surfaces 358. As discussed below, a guide surface 358 from adjacent hangars 354 can be adapted to receive a cartridge 310. The hangars 354 can also include two prongs 356. The prongs 356 can be cylindrical or can be of any shape commonly known in the art to engage and/or secure a gearbox 338. Further, while the illustrated embodiment shows two prongs 356, the present disclosure contemplates any number of prongs without deviating from the objects of the disclosure.

In an alternative embodiment, the plurality of cartridges 310 can be secured below the bottom tray 302 by a support member (not shown) extending the length of the particulate container 204. The support member can be, for example, a generally U-shaped beam with a plurality of openings to support the cartridges.

FIG. 8 illustrates a plurality of particulate handling systems 300 (FIG. 7) at various stages of installation. Beginning below so-called Sector A, two hangars 354 can be connected to the bottom surface of the particulate container 204, as discussed above. The hangars 354 can be parallel to one another and spaced to provide for installation of a cartridge 310. The cartridge 310 can be installed by sliding a lower surface of the input slot 332 (FIG. 5B) along guide surfaces 358, one from each of the adjacent hangars 354, as shown illustratively below Sector B. The advantageous design permits for ease of installation as well as removal and reinstallation should a cartridge 310 (and/or screw conveyor 316) need to be repaired or replaced with the same or different component. As illustrated below Sector C, the drive shaft 330 of the cartridge 310 can be installed over the shaft 328. The installation of the drive shaft 330 over the shaft 328 can occur either before or after the cartridge 310 has been installed between hangars 354. Thereafter, a gearbox 338 can be oriented such that the mounting holes 352 (FIG. 6) are aligned with the prongs 356 on the hangars 354, as shown illustratively below Sector D. In such an orientation, the drive shaft opening 346 (FIG. 6) can also be aligned with the drive shaft 330 of the cartridge 310. After installation of the gearbox 338 on the drive shaft 330, a pin 320 can be installed to rotatably engage the shaft 328 and the drive shaft 330, and a pin 322 can be installed to axially secure the drive shaft 330 on the inner shaft 328, as shown illustratively below Sector E. Further, securing means commonly known in the art can be used to secure the gearbox 338 to the prongs 356. The installation process described above can be repeated for each row unit along the length of each of the particulate containers 202 and 204. The main drive shaft 360 (FIGS. 11 and 16) can extend through and engage the main drive shaft openings 350 in each of the gearboxes 338.

Each of the gearboxes 338 can have a clutch (not shown) in operable communication with a control system. At the direction of the user or based on instruction from the control system, the control system can engage/disengage one or more predetermined clutches in order to activate/deactivate the associated one or more screw conveyors. In such an instance, the particulate metering system can provide for section control.

Figure 9:
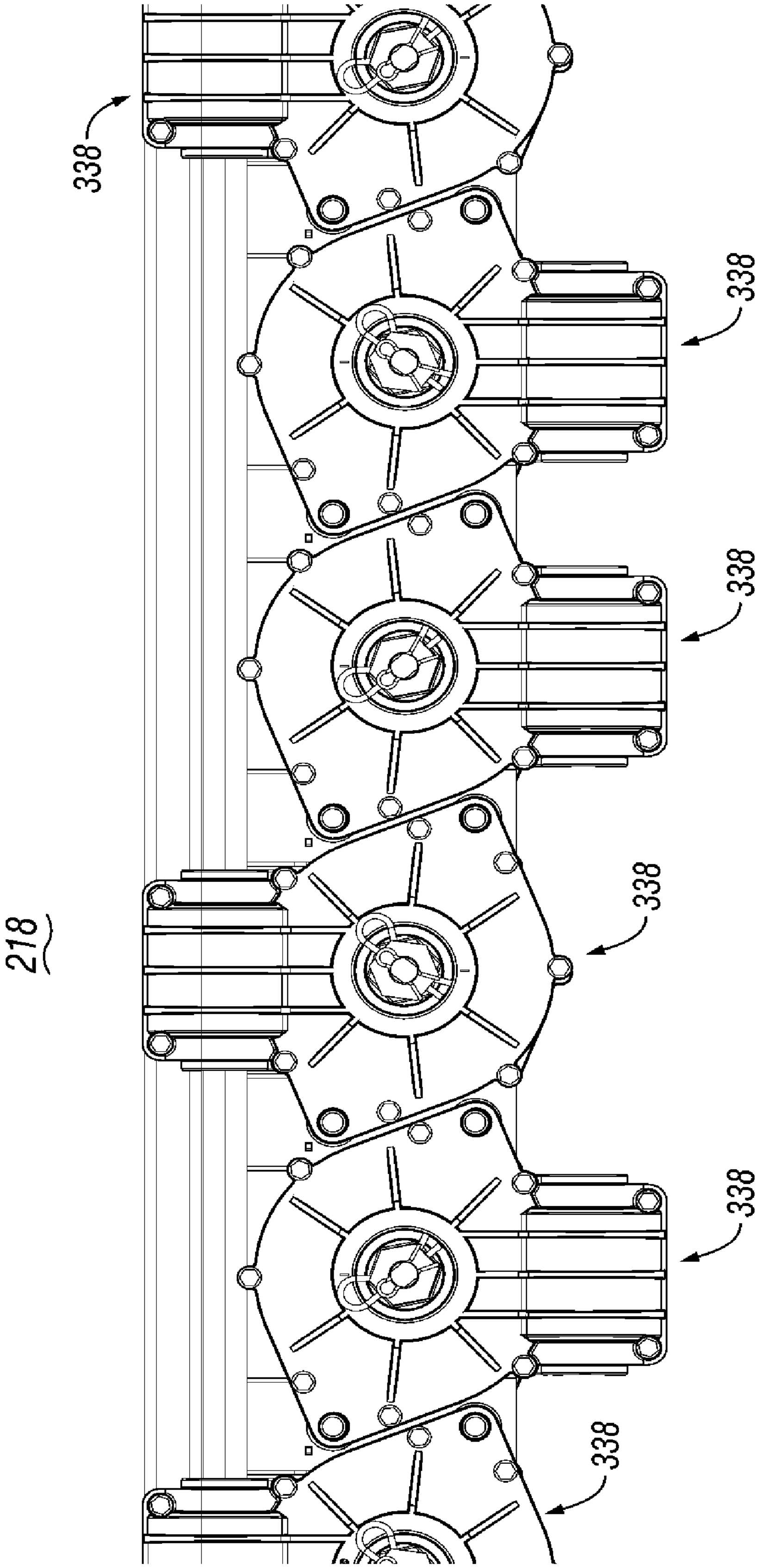
FIG. 9 is a partial front elevation view of a plurality of gearboxes in various configurations in accordance with an illustrative embodiment.

As shown illustratively in FIGS. 8 and 9, each of the two prongs 356 of the one hangar 354 can be connected to adjacent gearboxes 338. In other words, an upper prong of a hangar can be connected to one gearbox while a lower prong of the same hangar can be connected to an adjacent gearbox. The arrangement is due to an advantageous design of the gearbox 338, which can permit one or more gearboxes 338 to be removed, inverted and reattached to the same two prongs as previously connected, as shown illustratively in FIG. 9. The inversion of a gearbox 338 can provide several advantages over the state of the art. First, in an inverted position, one or more of the gearboxes 338 can be disengaged from the main drive shaft 360 (FIGS. 11 and 16) based on the needs of the application (e.g., in at least one instance, where one or more of the rows in the field does not require particulate metering). Second, a second main drive shaft (not shown) can be implemented and adapted to engage the one or more gearboxes 338 placed in an inverted position. The second main drive shaft can also extend the length of the particulate container 204 and can be parallel to the main drive shaft 360. In such an embodiment, the user can invert one gearbox or can invert multiple gearboxes to permit desired groupings of the same (e.g., every four gearboxes, every other gearbox, etc.) based on the needs of the operation/application. Furthermore, together with the same modularity for the companion particulate handling system associated with a second particulate container, the potential configurations can permit precise control over the blends of the particulate from the containers as well as application rates in which the blends are metered. Still further, the means of securing the gearboxes 338 to the implement can provide for efficient installation and/or uninstallation of the gearboxes 338 in instances of malfunction or failure.

FIG. 10 illustrates companion particulate handling systems 300 connected to a particulate accelerator 500. In particular, each of the plurality of short auger tubes 336 and each of the plurality of long auger tubes 337 can extend from a cartridge 310 operatively connected to a gearbox 338. The plurality of short auger tubes 336 and long auger tubes 337 and can be alternately disposed in parallel below a particulate container, as shown illustratively in FIG. 11. The alternating of the short auger tubes 336 and long auger tubes 337 can provide for a greater density of additional components disposed between particulate containers 202 and 204, and more particularly, a greater density of particulate accelerators 500.

In operation, particulate within the particulate container 204 can pass through the plurality of large gates 304 and a plurality of small gates 306 of the bottom tray 302 and the input slots 326 (shown in FIG. 5B) of the plurality of cartridges 310, as shown illustratively in FIG. 16. Referring now to FIGS. 11 and 16, the main drive shaft 360 can be connected to the plurality of gearboxes 338. Upon receiving an input force from the auger motor (not shown) via the gearbox 338, the drive shaft 330 rotates the screw conveyors 316. The flightings 318 of the screw conveyors 316 can transmit the particulate contained within the short auger tube 336 and long auger tube 337 towards particulate accelerators 500. The process described above can also occur for each unit row along the length of the particulate containers 202 and 204.

The particulate metering implement 100 can include an air handling system 400 (FIG. 1). The air handling system 400 can be disposed between and below a portion of the particulate containers 202 and 204.

Figure 12:
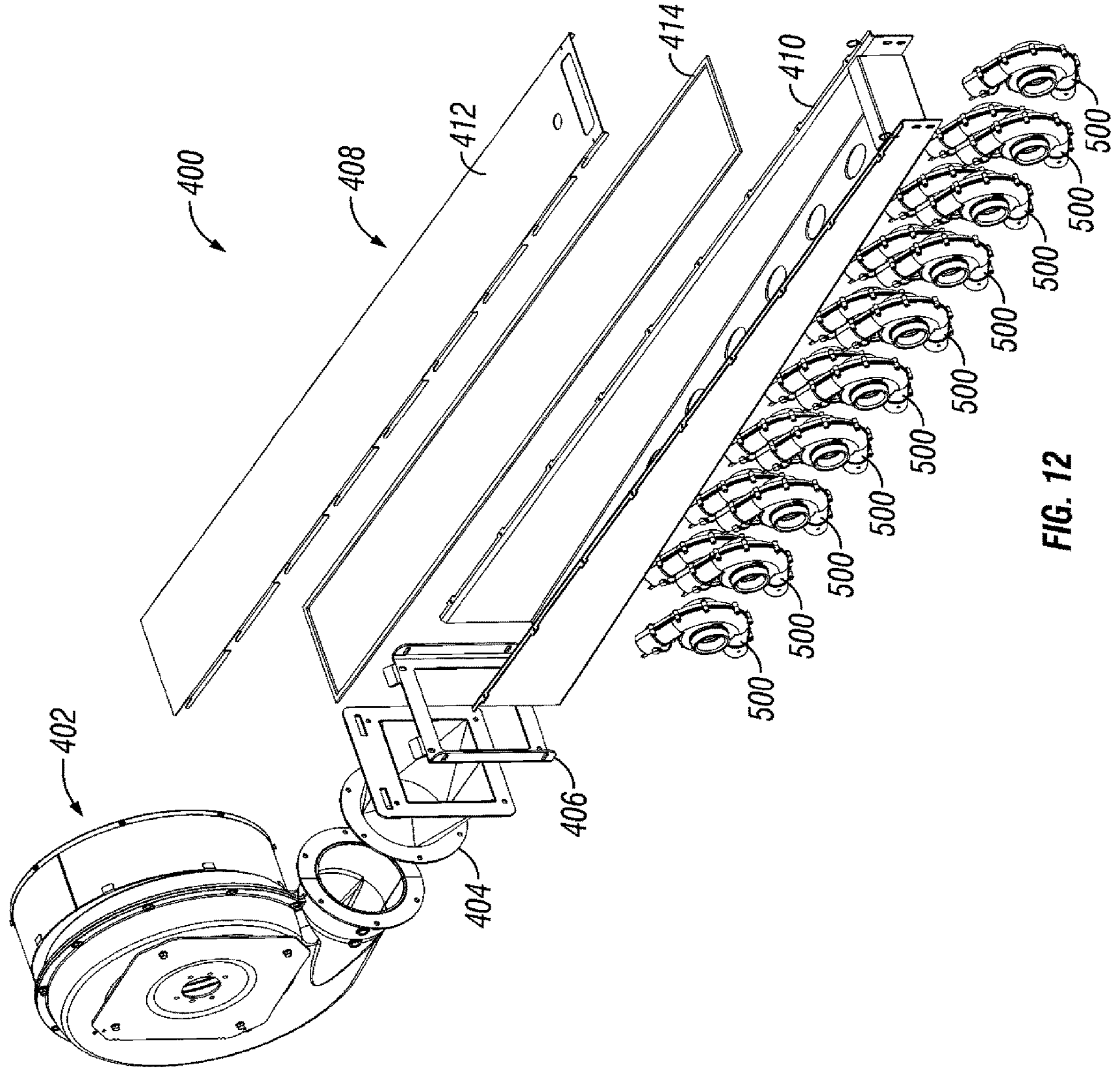
FIG. 12 is an exploded front perspective view of an air handling system in accordance with an illustrative embodiment.

FIG. 12 illustrates an exemplary air handling system 400. The air handling system 400 can include a blower 402 driven by a blower motor (not shown) to produce an airflow. In an embodiment, a representative blower can operate at 20 horsepower (HP) and produce a volumetric flow rate 120-150 cubic feet per minute (CFM) per row in operation. The disclosure also contemplates the blower 402 operating at variable revolutions per minute (RPM). In such instances, the blower 402 can require less horsepower than operating at a constant RPM. Operating the blower 402 at a constant RPM and/or variable RPM can be tailored to the specific demands of the particulate metering system 402 in a given application.

The blower 402 can be coupled to a plenum 408 via an extension 404 and a bracket 406. The disclosure envisions alternative characteristics for the extension 404, including but not limited to, a circular cross-section, a nozzle, an expander, and the like. The extension 404 can be made of steel, but the disclosure contemplates other materials such as aluminum, polymers, composites, ceramics, and the like. Further, the extension 404 can permit efficient installation and uninstallation of the blower 402 on the air handling system 400. In such instances, the blower used in operation can be customized to the specific needs of the application, further increasing the modularity of the system.

Figure 13:
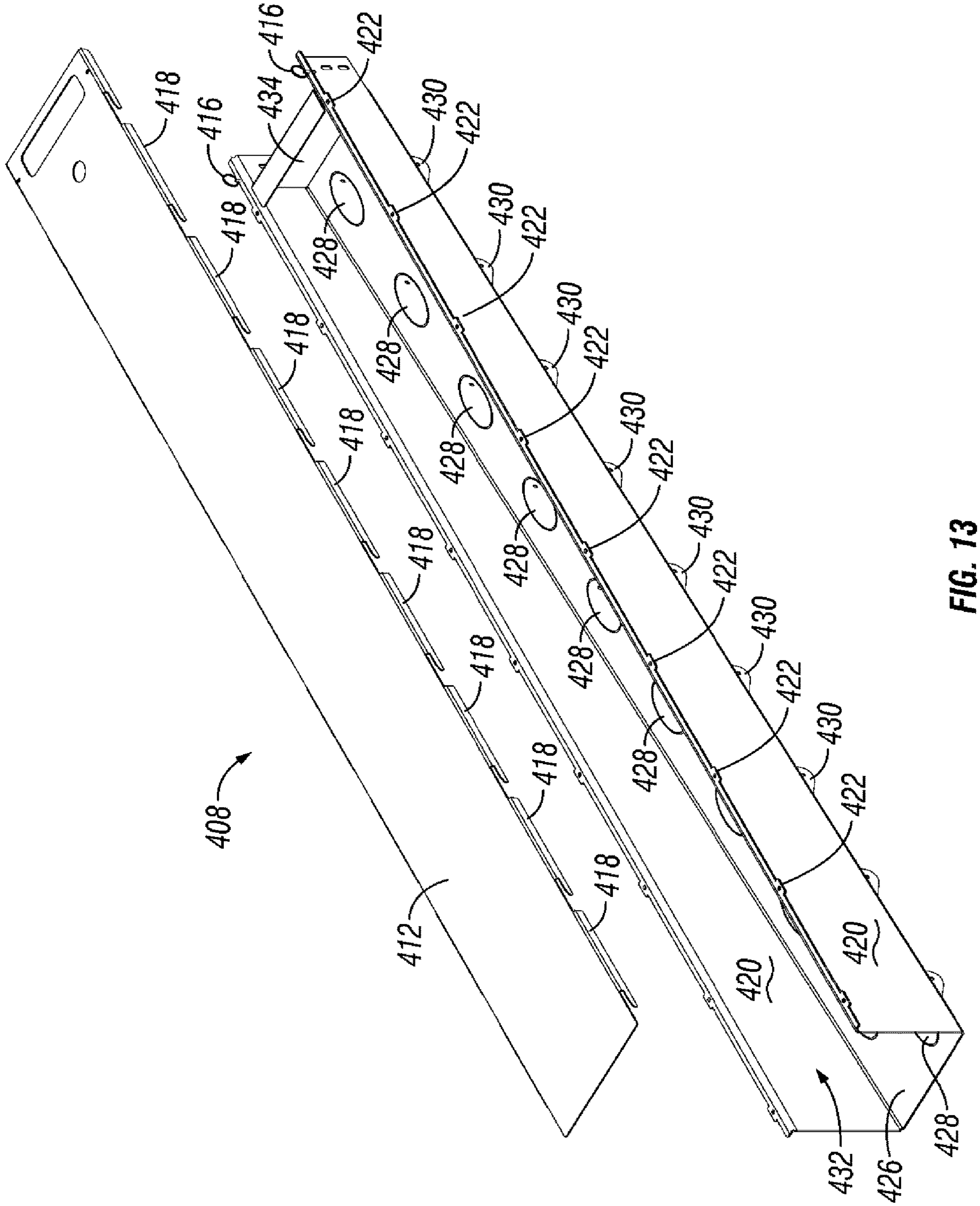
FIG. 13 is an exploded view of a plenum in accordance with an illustrative embodiment.

After exiting the extension 404, the air generated by blower 402 can enter an intake 432 of a plenum 408, as shown illustratively in FIGS. 12 and 13. The plenum 408 can include a plenum cover 412 removably connected to a plenum base 410. When installed, the plenum cover 412 can be sealed to the plenum base 410 with a gasket 414 contoured to outer edges of the same. To install or uninstall the plenum cover 412, the plenum cover 412 can include a plurality of downwardly extending flanges 418 adapted to mate with flanges 422 extending outwardly along the length of the sidewalls 420 of the plenum base 410. In particular, gaps between the flanges 422 on the plenum base 410 can receive to the plurality of downwardly extending flanges 418 on the plenum cover 412, after which the plenum cover 412 can be slid laterally into a locked position. Thereafter, pins 416 can be installed to ensure the plenum cover 412 remains in the locked position. The securing means can provide for rapid accessibility to the interior of the plenum 408 for servicing and the like.

The plenum base 410 can contain opposing sidewalls 420, a bottom wall 426 and a distal wall 434. A plurality of apertures 428 can be disposed within the bottom wall 426 of the plenum base 410. The plurality of apertures 428 can be arranged in two rows along the length of the plenum 408. The two rows of apertures 428 along the length of the plenum base 410 can be staggered longitudinally to maximize compactness of the particulate accelerators 500 disposed below the plenum and/or to impart the desired airflow characteristics within the plenum 408. The plurality of apertures 428 can be elliptical in shape. The disclosure, however, envisions other arrangements and/or shapes of the plurality of apertures without detracting from the objects of the disclosure. For example, the plurality of apertures 428 can be arranged in one row along the length of the plenum base 410, or the plurality of apertures 428 can be circular or rectangular in shape. The disclosure also contemplates the plurality of apertures disposed the sidewalls 420 and/or the plenum cover 412.

The sidewalls 420 can be trapezoidal in shape. In other words, at an edge of the plenum base 410 proximate to the intake 432, the sidewalls 420 are greater than the height of the same proximate to the distal wall 434. The tapering of the plenum base 410 can maintain the appropriate pressure and airflow characteristics along its length as air exits the plenum 408 through the plurality of apertures 428.

A plurality of outlet pipes 430 can be connected to the bottom wall 426 of the plenum base 410. Each of the plurality of outlet pipes 430 can be associated with each of the plurality of apertures 428. The outlet pipes 430 can be cylindrical in shape, but the disclosure envisions different shapes, including oval, ellipsoid, rectangular, square, and the like. The outlet pipes 430 can be secured the bottom wall 426 by means commonly known in the art, including but not limited to, pinning, welding, fastening, clamping, and the like. The outlet pipes 430 can be oriented such that an acute angle exists between the major axis of the outlet pipes 430 and the bottom wall 426 of the plenum base 410. The orientation of the outlet pipes 430 can impart the appropriate flow characteristics as air transitions from the plenum 408 to a particulate accelerator system 500 (FIG. 12).

Figure 15:
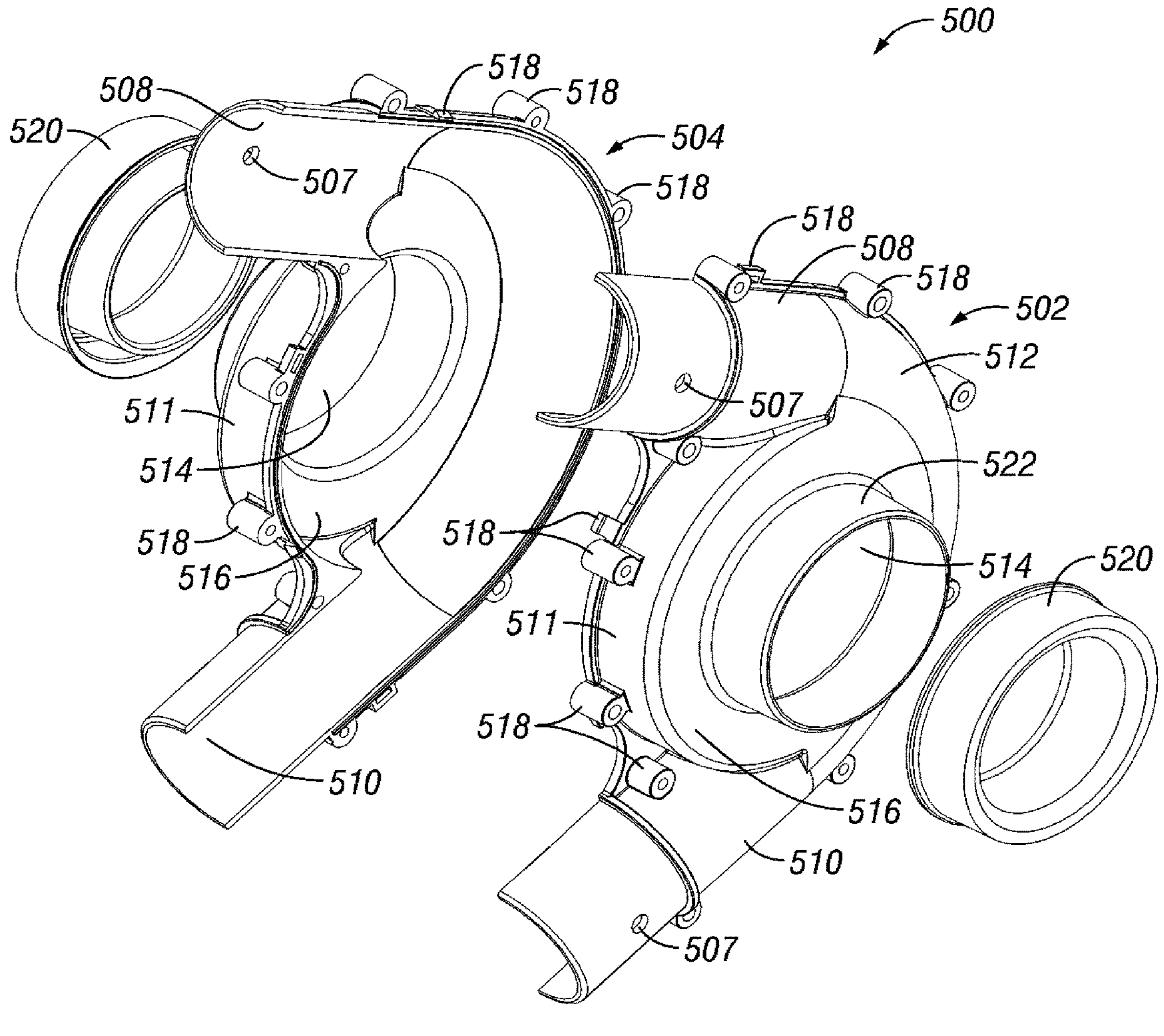
FIG. 15 is an exploded front perspective view of a particulate accelerator in accordance with an illustrative embodiment.

After passing through the plenum 408 and outlet pipes 430, air generated by the blower 402 can enter a plurality of particulate accelerators 500. Referring to FIG. 15, each of the plurality of particulate accelerators 500 can be comprised of two opposing halves 502 and 504 and secured by means commonly known in the art. In the illustrated embodiment, the two opposing halves 502 and 504 are joined by a plurality of snap-fit mechanisms and opposing holes 518 through which bolts, screws, pins, and the like, can be engaged. A gasket (not shown) can be disposed between the two halves 502 and 504 to provide a seal. Though two halves can provide for ease of manufacturing, the present disclosure envisions a unitary construction of the particulate accelerator 500. Further, the particulate accelerator 500 can be made of steel, but the disclosure contemplates other materials such as aluminum, polymers, composites, ceramics, and the like.

Extending outwardly from each opposing half 502 and 504 of the particulate accelerator 500 can be cylindrical flanges 522. Each cylindrical flange 522 can removably interface with a ringed gasket 520. In particular, the ringed gasket 520 can include two generally coaxial surfaces sized and shaped to create a frictional fit with the cylindrical flanges 522. The ringed gasket 520 can also be adapted to receive a short auger tube 336 or a long auger tube 337, discussed in detail below. The ringed gaskets 520 can provide a seal between the plurality of short and long auger tubes 336 and 337 and the particulate accelerators 500. The ringed gaskets 520 can maintain the seal while permitting relative movement of the short auger tubes 336 and/or long auger tubes 337 within the particulate accelerator 500 due to movement of the system as the particulate containers 202 and 204 are emptied, experience vibration, and the like. The present disclosure contemplates the short auger tubes 336 and the long auger tubes 337 can be connected to the cylindrical flanges 522 through other means commonly known in the art, including but not limited to, pinning, clamping, fastening, adhesion, and the like.

Figure 14:
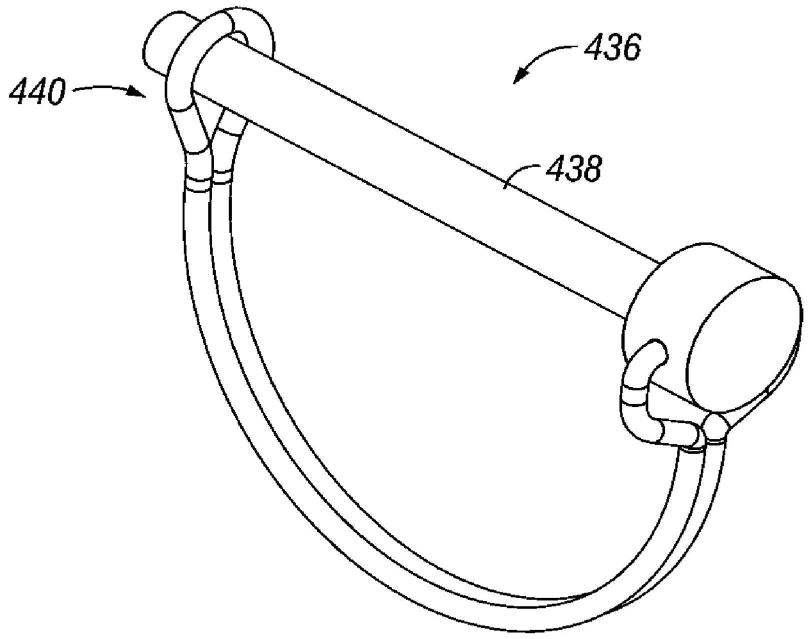
FIG. 14 is a front perspective view of a quick release coupler in accordance with an illustrative embodiment.

As shown illustratively in FIGS. 12 and 15, each of the plurality of particulate accelerators 500 can connect to each of the plurality of outlet pipes 430 of the plenum 408 via holes 507. The connection can be through a screw or any other means so as not to significantly impede the airflow through the particulate accelerator 500. In an embodiment as shown illustratively in FIG. 14, quick-release coupler 436 can engage the holes 507 and can provide for quick installation and/or removal of a particulate accelerator 500 on the plenum 408 and/or the discharge tubes on the particulate accelerator 500, thereby increasing the modularity of the system. The quick-release coupler 436 can include a cross member 438 and a semicircular ring 440. The semicircular ring 440 can be constructed from material that permits a user to deform the semicircular ring 440 to an extent necessary to release the ring 440 from a distal end of the cross member 438.

Referring to FIG. 15, an inlet tube 508 and outlet tube 510 can extend outwardly from a generally cylindrical main body 511. The main body 511 can be integrally formed or removably connected to the inlet tube 508 and/or the outlet tube 510. The main body 511 can have curved back wall 512 comprising an arc from the inlet tube 508 to the outlet tube 510. Adjacent to the curved back wall 512 can be opposing side walls 516. The opposing side walls 516 can be parallel to one another and generally parallel to the direction of airflow through the particulate accelerator 500. The cylindrical flanges 522 discussed above can extend outwardly and perpendicularly from each of the opposing side walls 522. The cylindrical flange 522 can have a center opening 514 adapted to receive particulate from the particulate handling systems 300.

In operation, particulate from a short auger tube 336 and a long auger tube 337 can be forced by a screw conveyor 316 into the particulate accelerator 500 through the center openings 514, as best shown illustratively in FIGS. 11 and 16. Upon reaching the particulate accelerator 500, the particulate mixture, consisting of a controlled ratio of a plurality of particulates, can descend vertically within the main body 511 due to the force of gravity.

After passing through the plenum 408, air generated by the blower 402 can enter an inlet 503 of a particulate accelerator 500 (FIG. 10). Due to the shape of the particulate accelerator 500, air can track in a flow pattern around the curved back wall 512 towards the outlet tube 511. In the process, air can mix with the particulate mixture descending vertically in the particulate accelerator 500 and can force at least a portion of the air-particulate mixture through an outlet 505 (FIG. 10). The air can provide a fluid bed upon which the particulate blend is suspended as it exits particulate accelerator 500 through the outlet 505. The particulate blend can then enter a hose (not shown) and be metered to a discharge point in any manner commonly known in the art. The process described above can occur simultaneously in each particulate accelerator 500 disposed along the length of the plenum 408.

Figure 17:
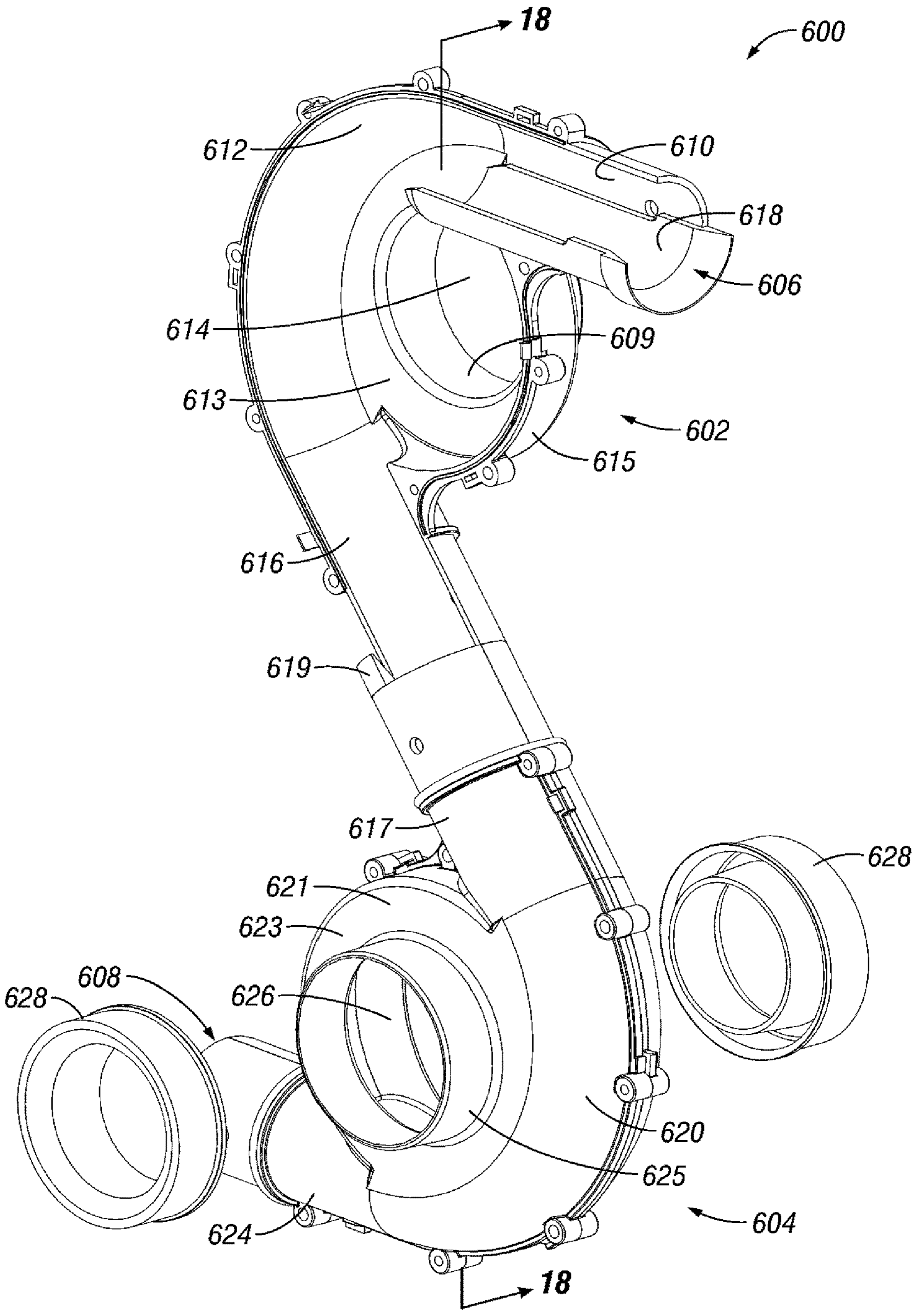
FIG. 17 is a front perspective view of a dual particulate accelerator system (with one half of a first particulate accelerator removed) in accordance with an illustrative embodiment.
Figure 18:
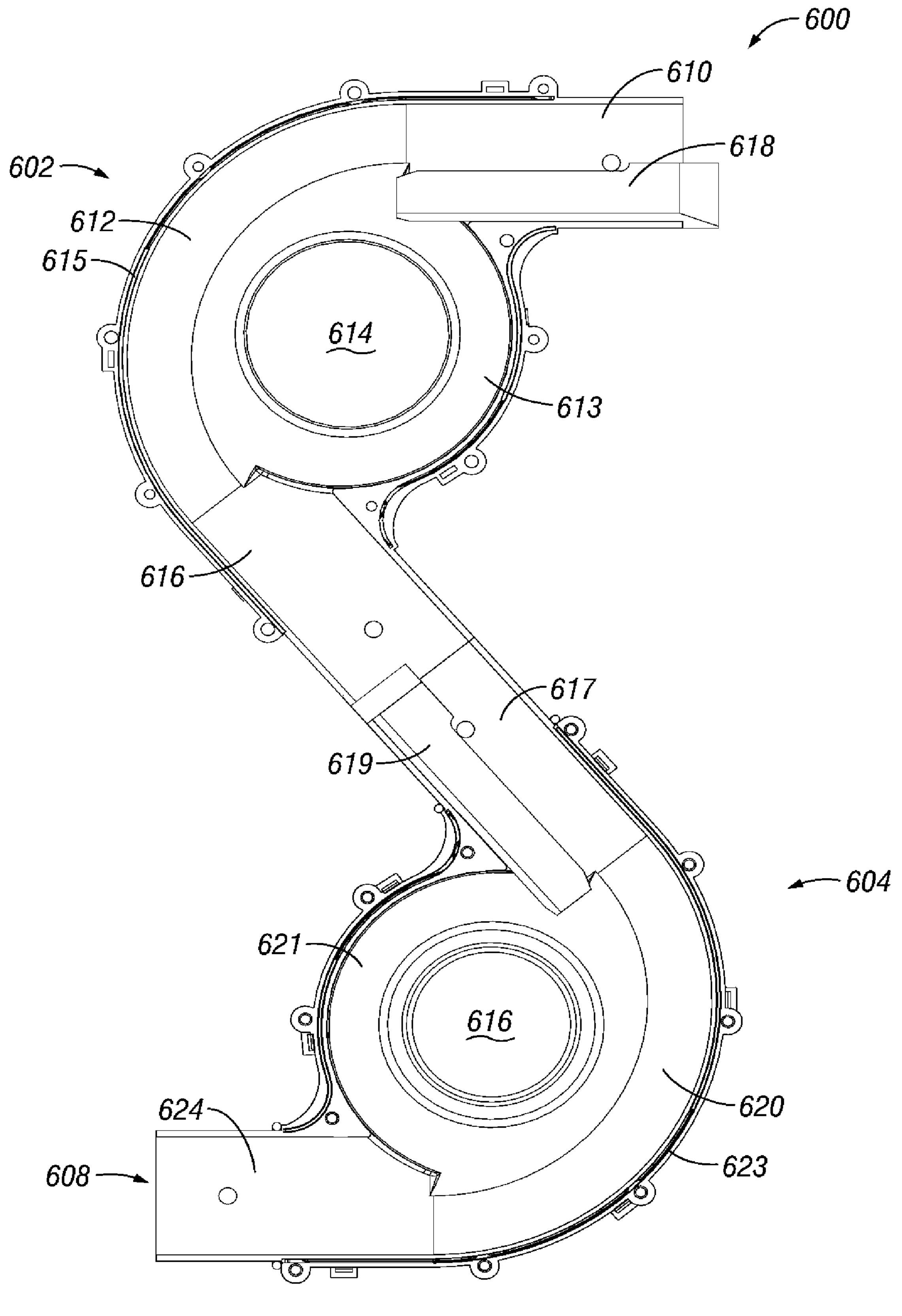
FIG. 18 is a cross-sectional side elevation view of the dual particulate accelerator system of FIG. 17 taken along section line 18-18.

Referring to FIGS. 17 and 18, a dual particulate accelerator system 600 is provided. The dual particulate accelerator system 600 can include a first particulate accelerator 602 and a second particulate accelerator 604. The structure and function of each of the particular accelerators 602 and 604 can be identical to the structure and function of the particulate accelerator 500 described above.

The dual particulate accelerator system 600 can include an inlet 606 and an outlet 608. The dual particulate accelerator system 600 can include a baffle 618 disposed proximate the inlet 606. The baffle 618 can restrict the flow of air through inlet tube 610 to impart the desired airflow characteristics in the first particulate accelerator 602. The present disclosure contemplates that the baffle 618 can be placed at any point within the flow of air to impart the desired airflow characteristics. The baffle 618 can be self-regulating, adjustable and/or controlled by any means commonly known in the art, including but not limited to, mechanical, electrical, electronic, pneumatic, and hydraulic controls.

The first particulate accelerator 602 can include an inlet tube 610, and an outlet tube 616. A first particulate accelerator main body 615 can be integrally formed to the inlet tube 610 and/or the outlet tube 616 of the first particulate accelerator 602. The first particulate accelerator main body 615 can be comprised of two halves are secured together through a plurality of clasps or other means commonly known in the art, or composed of a single structure. The first particulate accelerator 602 can be made of steel, but the disclosure contemplates other materials such as aluminum, polymers, composites, ceramics, and the like. The first main body 615 of the first particulate accelerator can be generally cylindrical in shape. The first main body 615 can have first curved back wall 612 comprising an arc from the inlet tube 610 to the outlet tube 616 of the first particulate accelerator 602. Extending outwardly from sidewalls 613 of the first main body 615 can be cylindrical flanges 609, upon which a gasket 628 can be disposed. The cylindrical flange 609 can have a center opening 614.

Likewise, the second particulate accelerator 604 can include an inlet tube 617 and an outlet tube 624. The inlet tube 617 of the second particulate accelerator 604 can be connected to the outlet tube 616 of the first particulate accelerator 602. A baffle 619 can extend from the outlet tube 616 of the first particulate accelerator 602 into the second particulate accelerator 604. The baffle 619 can restrict the flow of air through inlet tube 617 to impart the desired airflow characteristics in the second particulate accelerator 604. The baffle 619 can be self-regulating, adjustable and/or controlled by any means commonly known in the art, including but not limited to, mechanical, electrical, electronic, pneumatic, and hydraulic controls. A baffle 506 can also be implemented on particulate accelerator 500 consistent with the above disclosure, as shown illustratively in FIG. 10.

A second particulate accelerator main body 623 can be connected to the inlet tube 617 and/or the outlet tube 624 of the second particulate accelerator 604. The second main body 623 can be comprised of two halves are secured together through a plurality if clasps or any other means commonly known in the art, or composed of a single structure. The second particulate accelerator 604 can be made of steel, but the disclosure contemplates other materials such as aluminum, polymers, composites, ceramics, and the like.

A second main body 623 of the second particulate accelerator 604 can be generally cylindrical in shape. The second main body 623 can have second curved back wall 620 comprising an arc from the inlet tube 617 to the outlet tube 624 of the second particulate accelerator 604. Extending outwardly from sidewalls 621 of the second main body 623 can be cylindrical flanges 625, upon which a gasket 628 can be disposed. The cylindrical flange 625 can have a center opening 626.

In operation, particulate from a short auger tube 336 and a long auger tube 337 can be forced by a screw conveyor 316 into the first particulate accelerator 602 through the center opening 614. Upon reaching the particulate accelerator 602, the particulate mixture, consisting of a controlled ratio of a plurality of particulates, can descend vertically within the first main body 615 due to the force of gravity.

Concurrently, air can enter the first particulate accelerator 602 through the inlet 606 and the inlet tube 610. Due to the shape of the first particulate accelerator 602, air can track in a flow pattern around the curved back wall 612 towards the outlet tube 616. In the process, air can mix with the particulate mixture descending vertically in the first particulate accelerator 602 and can force at least a portion of the air-particulate mixture through outlet tube 616.

The air-particulate mixture exiting the first particulate accelerator 602 can enter the inlet tube 617 of the second particulate accelerator 604. The air-particulate mixture can track in a flow pattern around the curved back wall 620 towards the outlet tube 624 and outlet 608. In the process, the air-particulate mixture can further mix with a second particulate mixture descending vertically in the second particulate accelerator 604 and can force at least portion of the air-particulate mixture through outlet tube 624.

The air-particulate mixture exiting outlet 608 can include a blend of particulates mixed in the first particulate accelerator 602 and a blend of particulates mixed in the second particulate accelerator 604. In an exemplary embodiment, the process can permit fine control of four types of particulate without sacrificing loss of airflow efficiency. After the particulate mixture and air can enter a discharge tube (not shown) connected to the outlet tube 608, the particulate mixture can be metered to a field in any manner commonly known in the art. The process described above can simultaneously occur in each dual particulate accelerator systems 600 disposed along the length of the plenum 408.

The disclosure is not to be limited to the particular embodiments described herein. In particular, the disclosure contemplates numerous variations in the type of ways in which embodiments of the disclosure can be applied to modular particulate handling systems with variable blend and variable application rate controls for particulate matter. The foregoing description has been presented for purposes of illustration and description. It is not intended to be an exhaustive list or limit any of the disclosure to the precise forms disclosed. It is contemplated that other alternatives or exemplary aspects that are considered included in the disclosure. The description is merely examples of embodiments, processes or methods of the disclosure. It is understood that any other modifications, substitutions, and/or additions can be made, which are within the intended spirit and scope of the disclosure. For the foregoing, it can be seen that the disclosure accomplishes at least all that is intended.

The previous detailed description is of a small number of embodiments for implementing the disclosure and is not intended to be limiting in scope. The following claims set forth a number of the embodiments of the disclosure with greater particularity.

What is claimed is:

1. A modulated metering system for particulate, the system comprising:
- an air flow path having one inlet;
- a dual particulate accelerator system comprising:
  - a first particulate accelerator comprising:
    - an inlet tube;
    - an outlet tube;
    - a main body; and
    - a center opening passing through the main body;
  - a second particulate accelerator comprising:
    - an inlet tube coupled to the outlet tube of the first particulate accelerator;
    - an outlet tube;
    - a main body; and
    - a center opening passing through the main body;
- a first screw conveyor within a first auger tube capable of forcing the particulate into the first particulate accelerator through the center opening; and
- a second screw conveyor within a second auger tube capable of forcing the particulate into the second particulate accelerator through the center opening;
- wherein the particulate from the first particulate accelerator is mixed with the particulate from the second particulate accelerator and is forced through the second particulate accelerator outlet tube.

2. The modulated metering system of claim 1, further comprising a baffle coupled to the inlet tube of the first particulate accelerator.

3. The modulated metering system of claim 2, wherein the baffle restricts air flow through the inlet tube of the first particulate accelerator to impart the desired airflow characteristics in the first particulate accelerator.

4. The modulated metering system of claim 1, further comprising a baffle coupled to the inlet tube of the second particulate accelerator.

5. The modulated metering system of claim 4, wherein the baffle restricts air flow through the inlet tube of the second particulate accelerator to impart the desired airflow characteristics in the second particulate accelerator.

6. The modulated metering system of claim 1 wherein the main body of the first particulate accelerator is integrally formed with the inlet and outlet tube.

7. The modulated metering system of claim 1 wherein the main body of the first particulate accelerator comprises a first half and a second half secured together.

8. A modulated metering system for particulate, the system comprising:

- a plurality of particulate storage areas, each of the plurality of particulate storage areas having a separate type of particulate;
- an air flow path having one inlet;
- a dual particulate accelerator system comprising:
  - a first particulate accelerator comprising:
    - an inlet tube;
    - an outlet tube;
    - a main body; and
    - a center opening passing through the main body;
  - a second particulate accelerator comprising:
    - an inlet tube coupled to the outlet tube of the first particulate accelerator;
    - an outlet tube;
    - a main body; and
    - a center opening passing through the main body;
- a first screw conveyor within a first auger tube capable of forcing a first type of particulate into the first particulate accelerator through the center opening; and
- a second screw conveyor within a second auger tube capable of forcing a second type of particulate into the second particulate accelerator through the center opening;
- wherein the first type of particulate is mixed with the second type of particulate and is forced through the second particulate accelerator outlet tube.

9. The modulated metering system of claim 8, wherein the first particulate accelerator main body comprises:

- an arc extending from the inlet tube to the outlet tube; and
- cylindrical flanges extend outwardly from sidewalls; wherein the cylindrical flanges end in the center opening.

10. The modulated metering system of claim 8 further comprising a baffle coupled to the inlet tube of the first particle accelerator.

11. The modulated metering system of claim 10, wherein the baffle is self-regulating, adjustable or controlled.

12. The modulated metering system of claim 8 wherein the first auger tube is comprised of a short auger tube and a long auger tube, which force the first type of particulate into the first particulate accelerator.

13. The modulated metering system of claim 8, further comprising:

- a blower which provides airflow to the air flow path; and
- two rows of apertures along the base of the air flow path, the apertures coupling to outlet pipes.

14. The modulated metering system of claim 13, wherein the first particulate accelerator couples with at least one of the outlet pipes.

15. A modulated metering system for particulate, the system comprising:

- a flow path having:
  - an inlet in communication with one or more intake points; and
  - an outlet in communication with one or more discharge points;
  - a particulate storage with two or more separated storage areas in communication with the flow path; and
  - a dual particulate accelerator system comprising:
    - a first particulate accelerator comprising:
      - an inlet tube;
      - an outlet tube;
      - a main body; and
      - a center opening passing through the main body;
    - a second particulate accelerator comprising:
      - an inlet tube coupled to the outlet tube of the first particulate accelerator;
      - an outlet tube;
      - a main body; and
      - a center opening passing through the main body;
- a first screw conveyor within a first auger tube capable of forcing a first type of particulate into the first particulate accelerator through the center opening; and
- a second screw conveyor within a second auger tube capable of forcing a second type of particulate into the second particulate accelerator through the center opening;
- wherein the first type of particulate is mixed with the second type of particulate and is forced through the second particulate accelerator outlet tube.

16. The modulated metering system of claim 15, further comprising:

- an arc extending from the inlet tube to the outlet tube of the first particulate accelerator main body; and
- cylindrical flanges extend outwardly from sidewalls; wherein the cylindrical flanges end in the center opening.

17. The modulated metering system of claim 16, wherein the air-particulate mixture exiting the first particulate accelerator can enter the inlet tube of the second particulate accelerator.

18. The modulated metering system of claim 17, wherein the air-particulate mixture can track in a flow pattern around the arc towards the outlet tube.

19. The modulated metering system of claim 18, wherein the air-particulate mixture can further mix with a second air-particulate mixture descending vertically in the second particulate accelerator.

20. The modulated metering system of claim 15 wherein up to four different particulates can be mixed together in the air-particulate mixture.

* * * * *